(12) United States Patent
Mowill

(10) Patent No.: US 6,220,034 B1
(45) Date of Patent: Apr. 24, 2001

(54) CONVECTIVELY COOLED, SINGLE STAGE, FULLY PREMIXED CONTROLLABLE FUEL/AIR COMBUSTOR

(76) Inventor: R. Jan Mowill, c/o OPRA B.V., Opaalstraat 60-P.O. Box 838, 7550 AV Hengelo (NL)

(*) Notice: Subject to any disclaimer, the term of this patent is extended or adjusted under 35 U.S.C. 154(b) by 0 days.

(21) Appl. No.: 09/033,615

(22) Filed: Mar. 3, 1998

Related U.S. Application Data

(63) Continuation-in-part of application No. 09/001,628, filed on Dec. 31, 1997, now abandoned, which is a continuation-in-part of application No. 08/779,350, filed on Jan. 6, 1997, now Pat. No. 5,765,363, which is a division of application No. 08/264,844, filed on Jul. 5, 1994, now Pat. No. 5,638,674, which is a continuation-in-part of application No. 08/261,256, filed on Jun. 14, 1994, now Pat. No. 5,481,866, which is a continuation of application No. 08/086,833, filed on Jul. 7, 1993, now abandoned.

(60) Provisional application No. 60/038,943, filed on Mar. 7, 1997.

(51) Int. Cl.[7] .................................................. F23R 3/30
(52) U.S. Cl. .................................................. 60/737; 60/739
(58) Field of Search .......................... 60/39.36, 737, 60/738, 739, 752

(56) References Cited

U.S. PATENT DOCUMENTS

| | | |
|---|---|---|
| 1,705,383 | 3/1929 | Weiss . |
| 2,108,822 | 2/1938 | Lippincott . |

(List continued on next page.)

FOREIGN PATENT DOCUMENTS

| | | |
|---|---|---|
| 283198 | 5/1952 | (CH) . |
| 301137 | 11/1954 | (CH) . |
| 748208 | 10/1944 | (DE) . |
| 872698 | 3/1950 | (DE) . |
| 833739 | 3/1952 | (DE) . |
| 26 29 761 | 5/1978 | (DE) . |
| 28 12 237 | 5/1978 | (DE) . |

(List continued on next page.)

OTHER PUBLICATIONS

Sheperd, D.G. "Principles of Turbomachinery", New York, The Macmillan Co., 1956, pp. 282–289.
Csanady, G.T. "Turbomachines", New York; McGraw–Hill Book Co., 1964, pp. 14–23.
Cox, H.R., "Gas Turbine Principles and Practice", D. Van Nostrand, pp. 2–26, 2–39.
Treager, E.E., "Aircraft Gas Turbine Technology", 2nd Ed. p. 10.
Leonard, G. and Stegmaier, J., "Development of an Aero-derivative Gas Turbine DLE Combustion System," Diesel & Gas Turbine Worldwide, May 1993.

Primary Examiner—Louis J. Casaregola
(74) Attorney, Agent, or Firm—Finnegan, Henderson, Farabow, Garrett & Dunner

(57) ABSTRACT

A premixer for a combustor system has a venturi-type mixing tube with a flow axis, an inlet adjacent one axial mixing tube end, and a nozzle assembly at the opposite axial mixing tube end. The mixing tube inlet is flow connected to a source of compressed air and a source of fuel, and the mixing tube is connected to combustion chamber, an annular or can-type liner and an inlet, and the nozzle assembly extends into the combustion chamber and has at least one port for distributing the fuel/air mixture within a single stage combustion zone. In a preferred configuration, a pair of premixers are located at diametrically opposed positions on an annular combustion chamber, and the venturi axes are both radially disposed and axially inclined with respect to the combustion chamber axis. A single, centrally located, cylindrical air valve controls compressed air flow to both premixers through a manifold and distribution conduits.

49 Claims, 22 Drawing Sheets

U.S. PATENT DOCUMENTS

| | | |
|---|---|---|
| 2,183,836 | 12/1939 | Gordon, Jr. . |
| 2,268,270 | 12/1941 | Traupel . |
| 2,446,059 | 7/1948 | Peterson . |
| 2,469,238 | 5/1949 | Newton . |
| 2,487,514 | 11/1949 | Boestade et al. . |
| 2,488,969 | 11/1949 | Dietler . |
| 2,489,939 | 11/1949 | Traupel . |
| 2,513,601 | 7/1950 | Traupel . |
| 2,608,822 | 9/1952 | Pavlecka et al. . |
| 2,620,626 | 12/1952 | Lysholm . |
| 2,621,475 | 12/1952 | Loy . |
| 2,625,012 | 1/1953 | Larrecq . |
| 2,663,141 | 12/1953 | Hage . |
| 2,675,673 | 4/1954 | Mallinson et al. . |
| 2,837,894 | 6/1958 | Kind . |
| 2,988,884 | 6/1961 | Pouit . |
| 2,999,359 | 9/1961 | Murray . |
| 3,088,279 | 5/1963 | Diedrich . |
| 3,091,080 | 5/1963 | Crim et al. . |
| 3,099,134 | 7/1963 | Calder et al. . |
| 3,204,406 | 9/1965 | Howes et al. . |
| 3,315,467 | 4/1967 | De Witt . |
| 3,407,596 | 10/1968 | Dasbach et al. . |
| 3,430,443 | 3/1969 | Richardson et al. . |
| 3,626,444 | 12/1971 | Caruel et al. . |
| 3,691,762 | 9/1972 | Ryberg et al. . |
| 3,739,576 | 6/1973 | Chamberlain . |
| 3,765,170 | 10/1973 | Nakamura . |
| 3,765,824 | 10/1973 | Trozzi . |
| 3,768,962 | 10/1973 | Baranowski, Jr. . |
| 3,851,466 | 12/1974 | Verdouw . |
| 3,869,865 | 3/1975 | Lacroix et al. . |
| 3,899,884 | 8/1975 | Ekstedt . |
| 3,905,192 | 9/1975 | Pierce et al. . |
| 3,906,718 | 9/1975 | Wood . |
| 3,958,413 | 5/1976 | Cornelius et al. . |
| 4,012,904 | 3/1977 | Nogle . |
| 4,030,288 | 6/1977 | Davis et al. . |
| 4,073,137 | 2/1978 | Roberts . |
| 4,192,139 | 3/1980 | Buchheim . |
| 4,193,260 | 3/1980 | Carlisle et al. . |
| 4,215,535 | 8/1980 | Lewis . |
| 4,242,863 | 1/1981 | Bailey . |
| 4,255,927 | 3/1981 | Johnson et al. . |
| 4,260,367 | 4/1981 | Markowski et al. . |
| 4,286,430 | 9/1981 | Smith . |
| 4,297,842 | 11/1981 | Gerhold et al. . |
| 4,301,657 | 11/1981 | Penny . |
| 4,305,255 | 12/1981 | Davies et al. . |
| 4,356,698 | 11/1982 | Chamberlain . |
| 4,389,848 | 6/1983 | Marowski et al. . |
| 4,412,414 | 11/1983 | Novick et al. . |
| 4,457,704 | 7/1984 | Sommers et al. . |
| 4,610,135 | 9/1986 | Alexander . |
| 4,641,495 | 2/1987 | Mowill . |
| 4,700,542 | 10/1987 | Wang . |
| 4,702,070 | 10/1987 | Cureton et al. . |
| 4,713,938 | 12/1987 | Willis . |
| 4,747,262 | 5/1988 | Maynard . |
| 4,766,721 | 8/1988 | Iizuka et al. . |
| 4,807,433 | 2/1989 | Maclin et al. . |
| 4,829,764 | 5/1989 | Iizuka et al. . |
| 4,838,029 | 6/1989 | Gleason et al. . |
| 4,845,944 | 7/1989 | Rodgers . |
| 4,845,952 | 7/1989 | Beebe . |
| 4,893,466 | 1/1990 | Egnell et al. . |
| 4,898,001 | 2/1990 | Kuroda et al. . |
| 4,928,481 | 5/1990 | Joshi et al. . |
| 4,944,149 | 7/1990 | Kuwata . |
| 4,966,001 | 10/1990 | Beebe . |
| 4,974,415 | 12/1990 | Shekleton et al. . |
| 5,016,443 | 5/1991 | Shimizu et al. . |
| 5,069,029 | 12/1991 | Kuroda et al. . |
| 5,070,700 | 12/1991 | Mowill . |
| 5,081,832 | 1/1992 | Mowill . |
| 5,121,608 | 6/1992 | Willis et al. . |
| 5,156,002 | 10/1992 | Mowill . |
| 5,214,911 | 6/1993 | Shekleton . |
| 5,218,824 | 6/1993 | Cederwall et al. . |
| 5,257,499 | 11/1993 | Leonard . |
| 5,377,483 | 1/1995 | Mowill . |
| 5,611,196 | 3/1997 | Wilson . |
| 5,816,049 | * 10/1998 | Joshi ..................................... 60/737 |

FOREIGN PATENT DOCUMENTS

| | | |
|---|---|---|
| 33 32 959 | 3/1985 | (DE) . |
| 38 35 415 | 5/1989 | (DE) . |
| 92 15 856 | 4/1993 | (DE) . |
| 0 074 196 | 3/1983 | (EP) . |
| 0 100 135 | 2/1984 | (EP) . |
| 0 161 561 | 11/1985 | (EP) . |
| 0 247 984 | 12/1987 | (EP) . |
| 0 681 099 | 11/1995 | (EP) . |
| 0 731 316 A1 | 9/1996 | (EP) . |
| 1246455 | 10/1960 | (FR) . |
| 2189630 | 1/1974 | (FR) . |
| 2415203 | 8/1979 | (FR) . |
| 610641 | 10/1948 | (GB) . |
| 668834 | 3/1952 | (GB) . |
| 695342 | 8/1953 | (GB) . |
| 720436 | 12/1954 | (GB) . |
| 816678 | 7/1959 | (GB) . |
| 2 288 011 | 10/1995 | (GB) . |
| 55-45739 | 11/1980 | (JP) . |
| 57-41524 | 3/1982 | (JP) . |
| WO 94/00717 | 1/1994 | (WO) . |

* cited by examiner

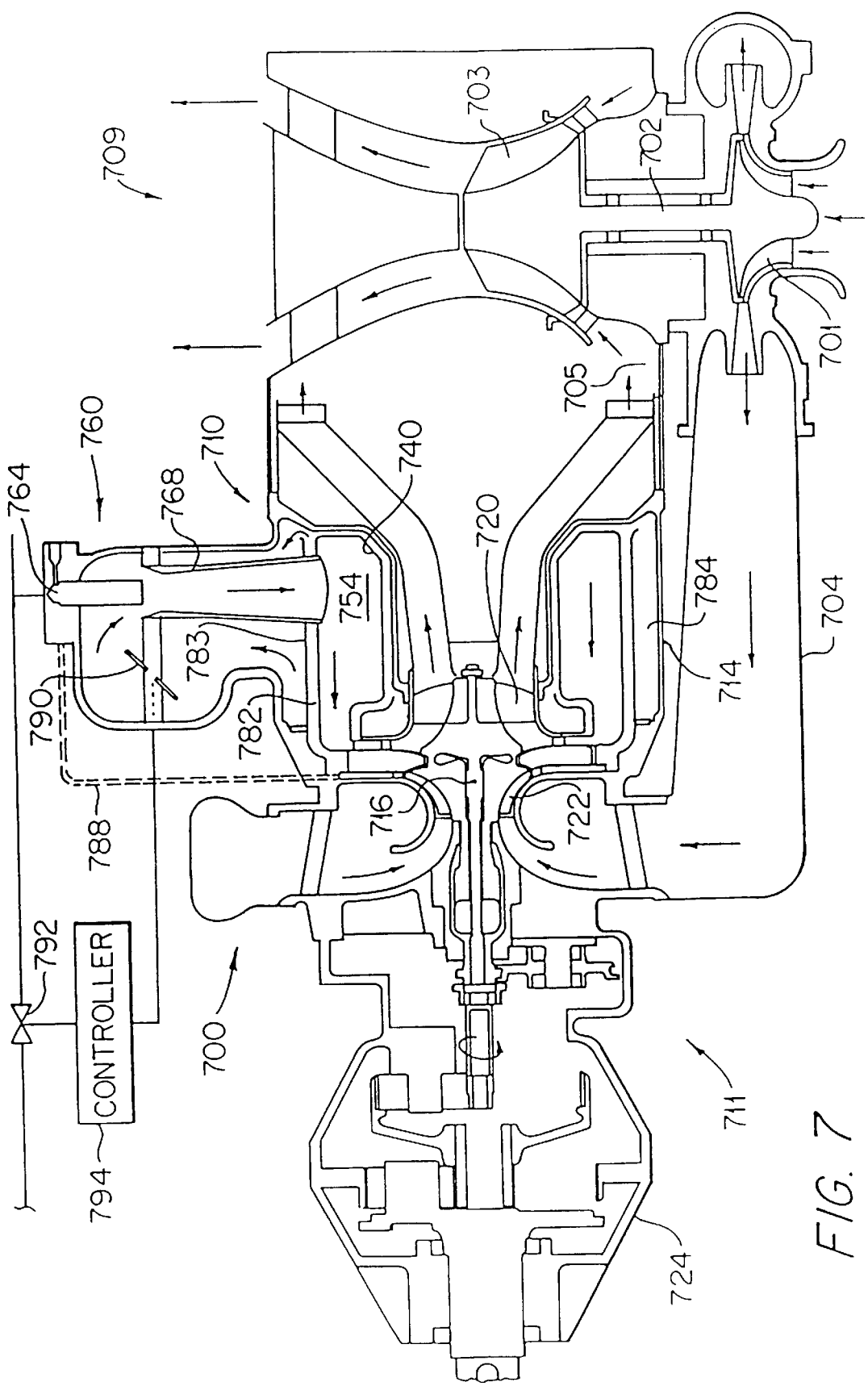

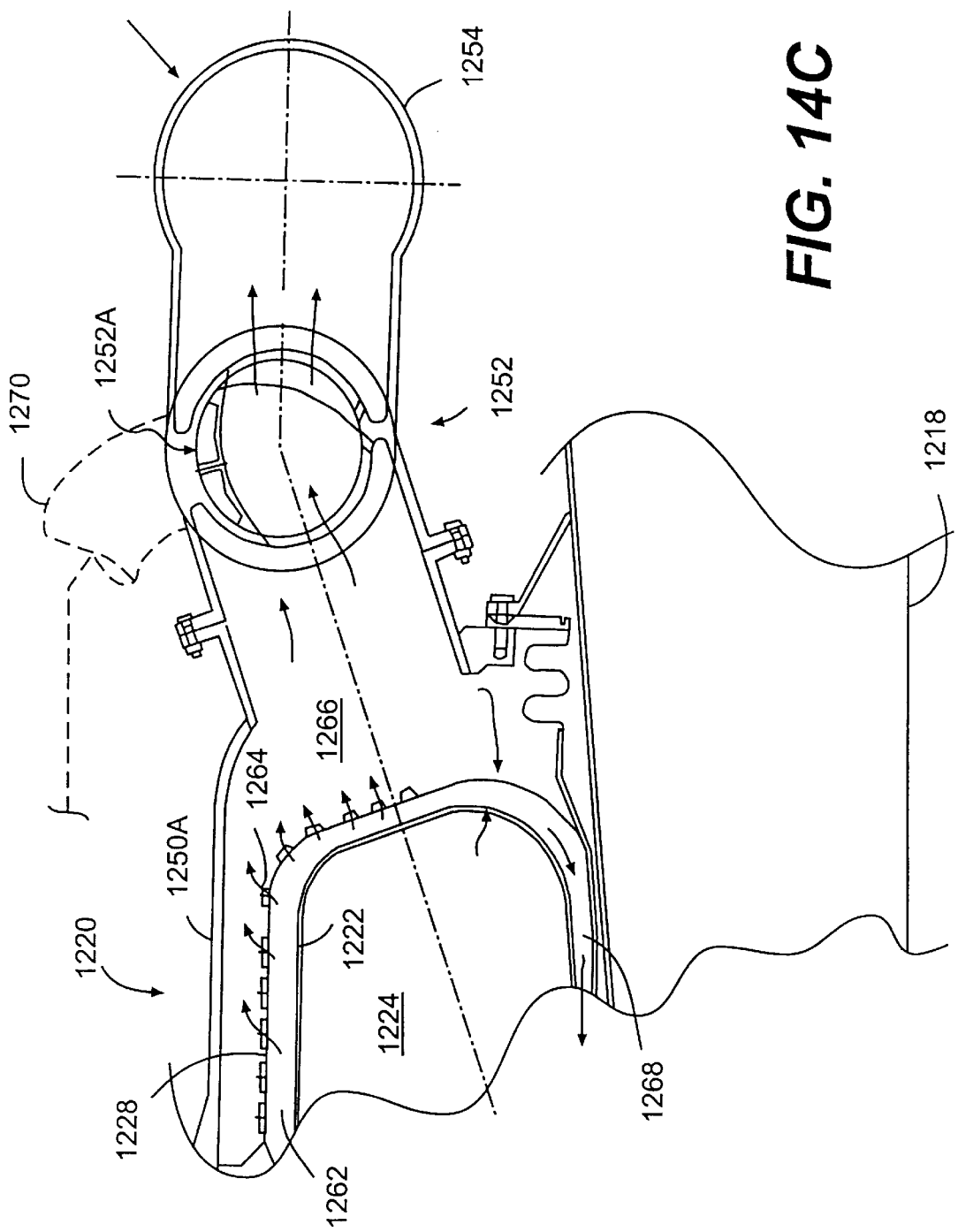

CONVECTIVELY COOLED, SINGLE STAGE, FULLY PREMIXED CONTROLLABLE FUEL/AIR COMBUSTOR

This application is a continuation-in-part of application Ser. No. 09/001,628, filed Dec. 31, 1997, now abandoned which is a continuation-in-part of application Ser. No. 08/779,350, filed Jan. 6, 1997, (U.S. Pat. No. 5,765,363) which is a divisional of Ser. No. 08/264,844, filed on Jul. 5,1994 (now U.S. Pat. No. 5,638,674), which is a continuation-in-part of Ser. No. 08/261,256, filed Jun. 14, 1994 (now U.S. Pat. No. 5,481,866), which is a continuation of Ser. No. 08/086,833, filed Jul. 7, 1993 (now abandoned). This application also claims a right of priority to the U.S. provisional application No. 60/038,943 filed Mar. 7, 1997, entitled "Premixer Assembly for Low Emission Gas Turbine Applications."

BACKGROUND OF THE INVENTION

1. Field of the invention

This invention relates to a combustion system for gas turbine gas generators, gas turbine engines, or other heat devices, which can produce significant advantages including low levels of pollutants, namely oxides of nitrogen, carbon monoxide, and unburned hydrocarbons. In one aspect, the present invention relates to a system, process, and apparatus for combusting fuel in a gas turbine or gas generator module which significantly lowers pollutants by providing a nearly constant fuel/air ratio in the combustion zone at all engine operating conditions in addition to thoroughly premixing the fuel and air prior to combustion and, when necessary, completely vaporizing a liquid fuel. In another aspect, the present invention relates to single stage, controllable fuel/air ratio combustors for gas turbine fuel/air premixer assemblies. In another aspect, the present invention relates to a mixing tube in a premixer chamber for a combustor system having a flow axis, an inlet port adjacent one axial mixing tube end, and a nozzle assembly at the opposite axial mixing tube end, the mixing tube inlet being flow connected to a source of compressed air and a source of fuel, the mixing tube being connected to the liner housing at a housing inlet port, and the nozzle assembly extending along the mixing tube flow axis into a combustion chamber and having at least one port for distributing the fuel/air mixture to a combustion zone.

2. Description of the Art

Although gas turbine devices such as engines and gas generators do not produce the majority of the nitrogen oxide emissions released into the earth's atmosphere, reducing those emissions will reduce the total and, in that regard, many countries have enacted laws limiting the amounts that may be released. The reaction of nitrogen and oxygen in the air to form nitrogen oxides, like almost all chemical reactions, proceeds faster at higher temperatures. One way to limit the amount of NO, formed is to limit the temperature of the reaction. The $NO_x$ produced in gas turbine devices is produced in the combustion process where the highest temperature in the cycle normally exists. Therefore, one way to limit the amount of $NO_x$ produced is to limit the combustion temperature.

Various attempts have been made to limit the combustion temperature and thereby $NO_x$ production in both "single stage" combustors (i.e., those having only a single combustion zone where fuel and air are introduced) and "multistage" combustors, including pilot burners where several, serial connected combustion zones having separate fuel and air introduction means are used. U.S. Pat. Nos. 4,994,149, 4,297,842, and 4,255,927 disclose single stage gas turbine combustors where the flow of compressed air to the combustion zone and the dilution zone of an annular combustor are controlled to decrease the concentration of $NO_x$ in the turbine exhaust gases. In the above combustors, essentially unmixed fuel and air are separately admitted to the combustor, with mixing and combustion consequently occurring within the same chamber. See also Japanese Laid-Open No. 55-45739. U.S. Pat. Nos. 5,069,029, 4,898, 001, 4,829,764, and 4,766,721 disclose two stage combustors. See also German Gebrauchsmuster, 99215856.0. Again, however, fuel and air are provided to each stage at least partially unmixed with complete mixing occurring within the respective combustion zones.

Attempts also have been made to utilize separate premixer chambers to provide a premixed fuel-air flow to a combustor. Japan Laid-Open Application No. 57-41524 a discloses a combustor system which appears to premix only a portion of the total fuel flow to a multistage can-type combustor in a separate mixing chamber prior to introduction to the staged combustion chambers. In U.S. Pat. No. 5,016,443, a large number of separate fuel nozzles are used to inject fuel into an annular premixer chamber. However, the complexity of the above constructions employing multiple fuel nozzles and fuel splitting devices can lead to control difficulties, as well as a high initial cost.

Accordingly, it is desired to design a combustor apparatus for use with gas turbine gas generator and engine modules, which apparatus can result in low emissions of pollutants and fuel by-products over the entire operating range of the gas turbine gas generator or engine module.

It is further desired to advantageously design a premixer system that can reduce "flash backs" from the combustor into the premixer, which can occur when the flame speed is greater than the velocity of the fuel/air mixture in the premixer. Flash backs can adversely affect the mechanical integrity and performance of the premixer system and related structure. It is further desired to advantageously design a premixer system that can reduce flow separation in the premixer resulting from the geometrical configuration of the premixer components. Flow separation can cause flash backs into the premixer. It is further desired to design a premixer system that can reduce pulsations in the delivery of fuel/air mixture from the premixer into the combustion chamber, which can occur due to the minor variations in the compressed air velocity in the premixer. Pulsations can adversely affect the combustor liner and engine structure. Each of the above described conditions, if they occur, can adversely affect the mechanical integrity and performance of the gas turbine. It is further desired to advantageously design a premixer system that can deliver fuel/air mixture into the combustion chamber in a manner that reduces the impingement of flow onto the combustor liner while maintaining a comparatively simple geometric configuration of the overall design. Impingement of the flow onto the liner wall can lead to carbon build up and decrease heat transfer performance and increase thermal fatigue.

It is further desired to design an apparatus that is relatively less complex than other state of the art annular combustor apparatus and systems thereby facilitating ease of operation, lower initial cost and maintenance of the apparatus, and substantially improved fuel/air control by the avoidance of matching a large number of separate premixers.

SUMMARY OF THE INVENTION

In accordance with the present invention as embodied and broadly described herein, the combustor system for operation with a source of compressed air and a source of fuel comprises a cylindrical liner defining a combustion chamber, the chamber having an axis and having one or more inlets adjacent one chamber end, the portion of the chamber adjacent said one chamber end comprising a combustion zone. The combustor system also includes one or more fuel/air premixers each disposed outside the liner and having an inlet for receiving compressed air, an inlet for receiving fuel, and a mixing tube for mixing the received compressed air and fuel and for delivering the fuel/air mixture to the combustion zone through the respective liner inlet. A mixing tube (e.g., a venturi) has an inlet, an outlet, and a flow axis. The mixing tube inlet is flow connected to a compressed air source and a fuel source, and the outlet is connected to the liner inlet to deliver the fuel/air mixture to the combustion zone.

In a preferred embodiment, the mixing tube has a flow axis substantially radially disposed with respect to the liner axis, an inlet adjacent one mixing tube axial end, and a nozzle assembly that extends along the mixing tube flow axis into the combustion chamber and having one or more ports for distributing the fuel/air mixture within the combustion zone.

It is further preferred that the total cross-section area of the nozzle assembly ports is sized relative to the maximum cross-sectional area of the mixing tube to provide acceleration of the mixture through the ports.

It is still further preferred that the nozzle assembly has channels, each angled away from the mixing tube flow axis and each terminating at a respective nozzle assembly port for directing the fuel/air mixture into the combustion zone. It is still further preferred that at least two of the nozzle assembly ports are oriented to deliver the fuel/air mixture in substantially opposed angular directions with respect to the liner axis.

Further, in accordance with the present invention, as embodied and broadly described herein, the combustion apparatus for gas turbine having a source of fuel and a source of compressed air for combustion comprises an annular combustion chamber including a portion defining a single stage combustion zone, the combustion chamber having an axis, and a premixer assembly interconnected to the fuel source and the compressed air source and having two premixers angularly spaced with respect to the combustion chamber axis, for mixing fuel with combustion air, and for delivering a fuel/air mixture to the combustion zone, the combustion chamber portion being otherwise sealed off from the compressed air source. Each premixer includes a mixing tube oriented such that its axis is substantially both radially disposed and axially inclined with respect to the combustion chamber axis, each mixing tube having an inlet and an exit, each premixer also having a housing surrounding the mixing tube inlet, the premixer housing having an air inlet, and a fuel inlet connected to the fuel source. A nozzle is connected to each mixing tube and extends into the single stage combustion zone for distributing the fuel/air mixture within the single stage combustion zone, the nozzle terminating in two or more ports angled relative to the respective mixing tube axis, wherein the respective flow directions through the two or more ports are substantially angularly opposed to each other relative to the combustion chamber axis. The premixer assembly further includes an air distribution manifold and a pair of distribution conduits each interconnecting the manifold to a respective premixer housing air inlet, and a single air valve in a flow path between the compressed air source and the manifold for controlling the flow of combustion air to both premixers through the manifold and the distribution conduits.

Preferably, the premixers are diametrically opposed, the manifold is angularly positioned substantially equidistant from the two premixers relative to the combustion chamber axis, and the air valve has a rotatable cylindrical section.

It is also preferred that each mixing tube has a maximum cross-sectional area at a location upstream of the nozzle, and that a total cross-section area of the ports is reduced relative to the mixing tube maximum area to provide acceleration of the fuel/air mixture through the ports.

It is still further preferred that the combustion apparatus includes a pressure vessel having a separable end portion, the pressure vessel surrounding the combustion chamber, and that the premixer assembly is mounted on the end portion to be separable therewith. The pressure vessel end portion also comprises part of a plenum, the plenum being flow connected to the premixers through the air valve along main combustion air flow paths, and each of the premixer housings is configured to pass an idle portion of combustion air from the plenum to the respective mixing tube bypassing the main combustion air flow paths between the plenum and the premixers.

Still further in accordance with the present invention, as embodied and broadly described herein, the combustion apparatus for a gas turbine having a source of fuel and a source of compressed air for combustion, the apparatus comprises a combustion chamber liner portion defining a combustion chamber and a combustion volume for combusting fuel with combustion air; the combustion chamber having an axis. Further, a premixer assembly is interconnected to the fuel source and the compressed air source and has a mixing tube with an axis for mixing fuel with essentially all the combustion air, and for delivering a fuel/air mixture into the combustion chamber in a path along the mixing tube axis, the combustion chamber liner portion being otherwise sealed off from the compressed air source. Further, a flame holder is positioned within the combustion chamber volume in the fuel/air mixture path.

It is further preferred that the flame holder is attached to or made part of the mixing tube and is configured as a nozzle assembly for distributing the fuel/air mixture within the combustion volume. The flame holder includes an extension member connected to the mixing tube and an end cap connected to the extension member, the extension member and end cap extending into the combustion volume and together forming the nozzle assembly which is cooled by the fuel/air mixture.

The technical considerations for the above-described invention involve the dynamics of the combustion process. The amount of nitrogen oxide in the exhaust can be expressed by the following equation:

$$NO_x = 3.2 * 10^{-6} * EXP(7.97 * 10^{-3} * T)\sqrt{P}$$

where T is the flame temperature in degrees Kelvin, $NO_x$ is the nitrogen oxide concentration coming out of the combustion zone, expressed as $NO_2$, in parts per million by volume, and P is the pressure in atmospheres. The flame temperature is a function of both the fuel/air ratio for completely premixed mixtures and of the combustor inlet air and fuel temperatures. Experience has shown that the flame in a combustor will continue to burn if the flame temperature is above about 2550 degrees Rankine (1417 degrees Kelvin) for pure fuels, or slightly higher for fuels containing a noncombustible diluent, such as nitrogen. However, at this level, the flame is close to extinction and the carbon monoxide emissions are high.

To have acceptably low levels of both pollutants, it is desirable to establish a fuel/air ratio that, in conjunction with the combustor inlet temperatures, will produce a flame temperature of about 2800 to 3000 degrees Rankine (1556 to 1667 degrees Kelvin). Use of the equation will show that the $NO_x$ levels will be between 0.8 and 2.0 ppmv (parts per million by volume) at one atmosphere before the dilution air is added to reduce them still more. Experience also has shown that carbon monoxide levels at these temperatures will be below 20 ppmv and will be even lower at higher pressures.

The constant fuel/air ratio in the combustion chamber of the present invention is produced by adjusting the air flow to the premixer to be proportional to the fuel flow. Experience has shown that it is not enough to just limit the average temperature because, when a fuel is burned as drops of liquid or a diffusion gas flame, the combustion proceeds at near the stoichiometric value and the local temperature is very high, thus producing excessive $NO_x$. To produce the lowest possible $NO_x$, the combustor of the present invention thoroughly premixes all the fuel and combustion air in a premixer separate from the combustion chamber itself, and if a liquid fuel is used, evaporates the fuel before premixing the fuel and air to be used in the combustion. Some gas turbine engine applications exhibit a nearly constant air flow regardless of power level (primarily single shaft direct-coupled electricity producers which must normally run at constant speed) and some have an air flow that decreases as the power level is reduced (such as free turbine units and propulsion units). To maintain a constant fuel/air ratio in both types of units;, it is often necessary to provide an air valve, coupled to the fuel valve, which provides the amount of air needed for a nearly constant fuel/air ratio. Obviously the valves will be different in the two types of engines, but the principle is the same.

However, certain aspects of the present invention are highly useful even in applications where precise control of the fuel/air ratio afforded by a separate compressed air valve is not needed, as in free-turbine and free-jet propulsion applications. In these applications, control of the compressed air is accomplished automatically by virtue of the dependency of gas generator RPM on fuel flow. Thus, the increased combustion efficiencies and simplicity of construction resulting from the admission of the premixed fuel/air, and the use of substantially all the compressed air flow portion not premixed with the fuel for convective cooling, are significant advantages available for such applications in which a compressed air valve, if included, could be preset to a constant opening or the valve eliminated entirely.

In this invention only one combustion zone is used and the fuel/air ratio and flame temperature will always be high enough to effectively burn the carbon monoxide and hydrocarbons. Therefore, this invention not only produces low emissions of nitrogen oxides, but low emissions of carbon monoxide and unburned hydrocarbons as well by avoiding transition zones between stages of combustion. Since this invention has only one combustion zone, it is not necessary to separate a primary and secondary combustion zone (multistage combustor) or to cool such a separation. Also, it may not be necessary to use a pilot flame or associated apparatus. Furthermore, the control system is vastly simplified by having one fuel control valve which must be precise and, at most, one compressed air control valve for each premixer assembly which is more forgiving where accuracy and leakage are concerned. Additional simplification is possible in certain applications which allow the elimination of the compressed air control valve.

The air-fuel mixing devices particularly described and shown in detail hereinafter, provides a nearly uniform fuel/air weight ratio at its exit. Of course, it is necessary to keep the axial velocity above the turbulent flame speed at all points within the mixing tube and to prevent any recirculation within the fuel/air mixing system. If these requirements are met, combustion cannot occur before the fuel/air mixture leaves the premixing device.

Other objects and advantages of the invention will be set forth in part in the description which follows, and in part will be apparent from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute part of the specification, illustrate preferred embodiments of the invention and, together with the description serve to explain the principles of the invention.

In the drawings:

FIG. 7 is a schematic cross-section of yet another gas turbine engine module made in accordance with the present invention;

FIG. 14C is a schematic cross-section through the engine module part depicted in FIG. 14B taken along the line 14C—14C;

DESCRIPTION OF THE PREFERRED EMBODIMENTS

Reference will now be made to the present preferred embodiment of the invention which is illustrated in the accompanying drawings.

Figure 1:
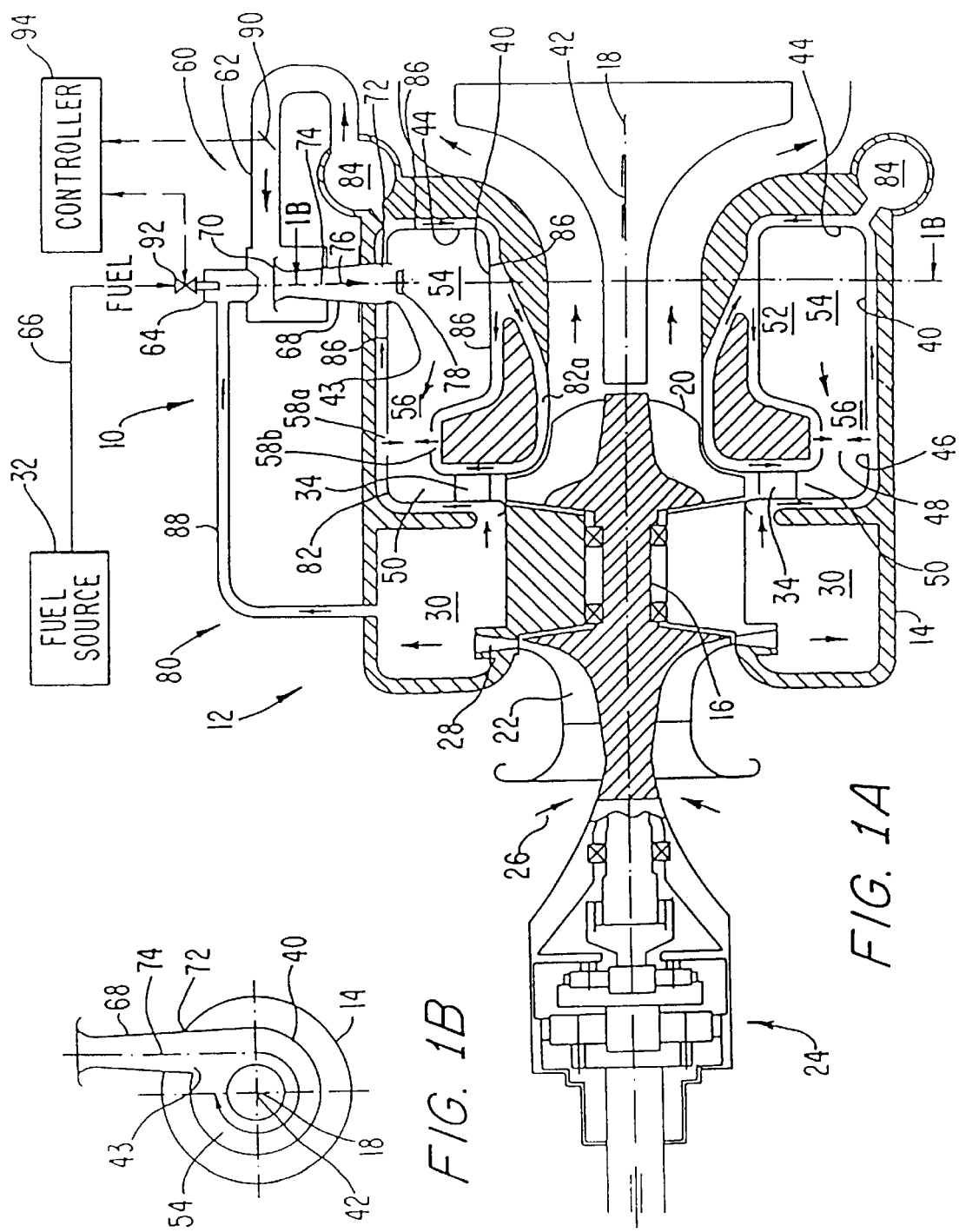
FIG. 1A is a schematic cross-section of a gas turbine engine module utilizing a combustor system made in accordance with the present invention.
FIG. 1B is a schematic end view of the apparatus shown in FIG. 1A taken in the direction AA in FIG. 1A.

With initial reference to FIG. 1A, there is shown a combustor system made in accordance with the present invention and designated generally by the numeral 10. System 10 is depicted as being used in conjunction with radial gas turbine engine module 12. Gas turbine engine module 12 includes a pressure housing 14 within which is mounted shaft 16 rotatable about axis 18. Mounted on one end of a shaft 16 is radial turbine 20 for driving centrifugal compressor 22 mounted at the opposed end of shaft 16. In the configuration depicted in FIG. 1A, gas turbine engine module 12 power is taken out through a mechanical coupling arrangement shown generally at 24 adjacent centrifugal compressor 22. However, the combustor system of the present invention can be utilized in a gas generator in association, e.g., with a "free power turbine" (see FIG. 5A), a "free-jet" propulsion unit (not shown), or any other turbine engine system version as one skilled in the art would immediately realize. Also, the present invention is not limited to use in a radial gas turbine engine or gas generator module but, at least in its broadest extent, could be used with axial or mixed axial-radial turbine engine and gas generator modules as well.

With continued reference to FIG. 1A, gas turbine engine module 12 operates generally as follows. Air enters centrifugal compressor 22 in a direction designated by the arrows 26, is centrifugally accelerated to increase its velocity, whereupon it enters diffuser 28 to increase static pressure. The compressed air exiting diffuser 28 is collected in a plenum chamber 30. Thereafter, compressed air from plenum 30 is mixed with fuel from a fuel source 32 by means of premixer 60 of combustor system 10, to be described in more detail hereinafter, to produce hot exhaust gases which flow past inlet guide vanes 34 to radial turbine 20, where power is extracted. The exhaust gases from turbine 20 are ducted to the atmosphere or to a subsequent engine module. In the case of free power turbine arrangement, the gases exiting turbine 20 would be ducted to the free power turbine for extraction of further power.

In accordance with the present invention, the combustor system includes a cylindrical housing defining a combustion chamber, the housing having an axis and having at least one inlet port adjacent one axial chamber end. Importantly, the portion of the chamber adjacent the one axial chamber end comprises a single stage combustion zone. An exhaust is positioned at the opposite axial chamber end, with the portion of the combustion chamber adjacent the opposite axial chamber end comprising a dilution zone. The housing further has aperture means in the form of dilution ports in flow communication with the dilution zone.

As embodied herein, and with continued reference to FIG. 1A, combustor system 10 includes annular combustor liner housing 40 ("housing" or alternatively referred to as a "liner"), which is generally toroidal in shape. Although the preferred embodiment is illustrated with an annular housing, a "can-type" cylindrical housing could also be used. Housing 40 is contained within pressure vessel 14 and defines an axis 42 essentially coincident with gas turbine engine module axis 18. Housing 40 is closed at axial end 44 except for inlet port 43, but is open at axial end 46 to form an annular exhaust port (or combustor exit) 48. Exhaust port 48 is in flow communication with radial turbine 20 through channel 50 past inlet guide vanes 34.

With continued reference to FIG. 1A, toroidal chamber 52 defined by housing 40 comprises two generally axial sections with different functions. Section 54 adjacent axial end 44 comprises a single stage combustion zone and section 56 adjacent housing end 46, comprises a dilution zone. A plurality of apertures 58a, 58b are provided in housing 40 opening into dilution zone 56. Dilution ports 58a are a series of apertures formed in the outer peripheral surface of housing 40, while dilution ports 58b are a series of apertures formed in an inner peripheral surface of housing 40, relative to housing axis 42. The aperture means generally comprising dilution ports 58a, 58b provide for the introduction of compressed air into the dilution zone 56 of combustion chamber 52 from compressed air conduit means which will be described in more detail hereinafter. However, dilution apertures need not be placed in both inner and outer walls of the combustion liner. For example, aperture 58a may be eliminated if apertures 58b are used and sized to accommodate the entire dilution flow rate.

Further in accordance with the present invention, at least one fuel/air premixer disposed outside the cylindrical housing is provided for mixing a portion of the compressed air flow with fuel to provide a fuel/air mixture and delivering the mixture to the combustion zone through the inlet port. The fuel/air premixer includes means for receiving the compressed air, means for receiving the fuel and also chamber means for flow-smoothing the received compressed air and for mixing the received compressed air and fuel. As embodied herein and with continued reference to FIG. 1A, combustion system 10 further includes a single fuel/air premixer designated generally by the numeral 60. Premixer 60 includes housing assembly 62 for receiving the compressed air from conduit means which will be described in more detail hereinafter, and a single fuel nozzle 64 for receiving fuel from fuel source 32 via fuel line 66. Fuel nozzle 64 depicted in FIG. 1A is an "air-blast" type fuel nozzle especially advantageous for use with liquid fuel to provide atomization and thus enhance vaporization. However, use of an "air blast" nozzle with gaseous fuel can provide benefits in terms of providing an initial mixing of the fuel with air prior to admission to the venturi element which will be described hereinafter. Therefore, the combustion system of the present invention is not restricted to the use of liquid fuel or an "air-blast" fuel nozzle, but gaseous fuel and other types of fuel nozzles, such as swirling-type nozzles, can be used as well.

Fuel/air premixer 60 further includes mixing chamber means in the form of venturi having venturi inlet 70 disposed within fuel/air premixer housing assembly 62 and venturi exit 72 connected to inlet port 43. Venturi 68 defines a flow axis 74, and fuel nozzle 64 is positioned to deliver a fuel spray into venturi inlet 70 substantially along axis 74. The cross sectional flow area and dimensions of venturi 68 are chosen to provide vigorous and complete mixing of the fuel and compressed air within the venturi chamber and a directed flow of the resulting mixture along venturi axis 74 to combustion zone 54, such as indicated schematically by arrow 76. The flow area of venturi exit 72 should be chosen such that minimum velocities of the mixture (i.e., during idle) are greater than the flame propagation speed of the fuel/air mixture. Flame holder means such as depicted schematically as 78 may be provided proximate venturi exit 72 to enhance the stability of combustion in combustion zone 54.

As best seen in FIG. 1B, mixing venturi 68 is disposed such that venturi axis 74 is oriented substantially tangentially with respect to housing axis 42 such that the incoming fuel/air mixture is caused to swirl about axis 42 within the combustion zone 54. It has been found using the preferred premixer construction to be described in more detail henceforth that combustion chamber 52 can be adequately fed by using only a single fuel/air premixer fed by a single fuel nozzle. However, the present invention contemplates the possible use of multiple fuel/air premixers, particularly for situations wherein the radial "thickness" of combustion chamber 52 is small relative to the outer radius thereof, as measured from axis 42.

Advantageously, and in accordance with the present invention, the combustor system preferably includes an ignitor disposed on the cylindrical liner housing at a location adjacent the intersection of the flow axis of the venturi. As embodied herein, and with continued reference to FIG. 1B, ignitor 79 is positioned near the intersection of flow axis 74 and housing 40, and extends at most only a short distance into combustion zone 54. Ignitor 79 is thus ideally positioned to intercept the fuel/air mixture emanating from premixer 60 to initiate combustion. Once started, the swirling hot combustion gases in zone 54 will provide auto ignition of the fuel/air mixture and ignitor 79, which may be electrical, will normally be shut off.

Further in accordance with the present invention, compressed air conduit means are provided interconnecting the compressor exit and the fuel/air premixer for delivering a portion of the compressed air flow to the premixer compressed air receiving means and for delivering essentially the remaining portion of the compressed air flow to the aperture means for providing dilution air to the dilution zone. As embodied herein, and with continued reference to FIG. 1A, compressed air conduit means designated generally by the numeral 80 includes generally annular passageway 82 disposed between pressure housing 14 and housing 40. Passageway 82 extends between compressed air receiving plenum 30 and a ring-shaped plenum 84 and is formed as part of pressure vessel 14 adjacent the turbine exhaust section. Fuel/air premixer housing assembly 62 is connected to receive compressed air from plenum 84 for eventual communication to the venturi inlet 70 as explained previously. Plenum 84 is shown having a circular cross section but other shapes, configurations and locations are possible and are considered within the scope of the present invention.

As can be appreciated from the schematic in FIG. 1A, passageway 82 is configured such that the compressed air flowing therein provides cooling for housing 40, particularly housing portion 86 immediately surrounding the combustion zone 54 where the highest combustion temperatures are expected. Portion 86 of housing 40 is constructed for convection cooling only, with no film-cooling necessary. That is, in portion 86 of housing 40, the housing acts to seal off the compressed air flowing in passageway 82 from the fuel/air mixture being combusted in combustion zone 54. This construction provides for control of the fuel/air ratio of the mixture in combustion zone 54 and permits operation as a "single stage combustor" with a desired lean fuel/air ratio. Such an operation can yield low levels of $NO_x$ and unburned fuel and fuel by-product levels. As will be discussed henceforth, the particular construction of the combustor system of the present invention permits extraordinarily low levels of $NO_x$ in comparison with other state of the art combustion systems.

Passageway 82 essentially envelopes combustion chamber 52 to provide convection cooling and also to supply compressed air to dilution ports 58*a* and 58*b*. Passageway 82 also may include a channel 82*a* for channeling compressed air flow for cooling the portion of the pressure vessel 14 adjacent turbine 20, as is shown in FIG. 1A. Turbine inlet guide vanes 34 may be film cooled inlet guide vanes and may be fed from passageway 82 or 82*a*. Also, compressed air conduit means 80 can include a separate passageway 88 interconnecting the compressed air receiving plenum 30 and air-blast fuel nozzle 64 when such a nozzle is used, particularly with liquid fuel operation.

As would be understood from the foregoing discussion in conjunction with FIG. 1A, compressed air conduit means 80 acts to channel a portion of the compressed air flow to the fuel/air premixer 60 and to channel essentially the remaining portion of the compressed air flow to the dilution ports 58*a* and 58*b*. The compressed air flow not channeled to either the fuel/air premixer or the dilution ports, namely the air used to cool the inlet guide varies 34, is very small and in any event does not disturb the fuel/air ratio in the combustion zone but merely results in a small further dilution of the exhaust gases prior to entry into turbine 20.

Further in accordance with one aspect of the present invention, valve means are disposed in the compressed air flow path for determining the compressed air flow rate to the premixer. The compressed air valve means is especially important where the speed of the compressor, and thus the volumetric flow rate of compressed air, is essentially independent of the fuel flow rate, such as the application depicted in FIG. 1A. As embodied herein and with continued reference to FIG. 1A, valve 90 is positioned in fuel/air premixer housing assembly 62 for determining the rate of compressed air flow from plenum 84 to venturi inlet 70. Valve 90 is continuously adjustable, and a suitable construction of valve 90 will be discussed in more detail hereinafter in relation to the description of one preferred construction of the fuel/air premixer of the present invention. When the valve opening changes, the pressure drop over the premixer changes, resulting in an increase or decrease of air mass flow to the dilution zone. Thus, this variation and dividing of the air flow happen outside the combustor proper.

Figure 2:
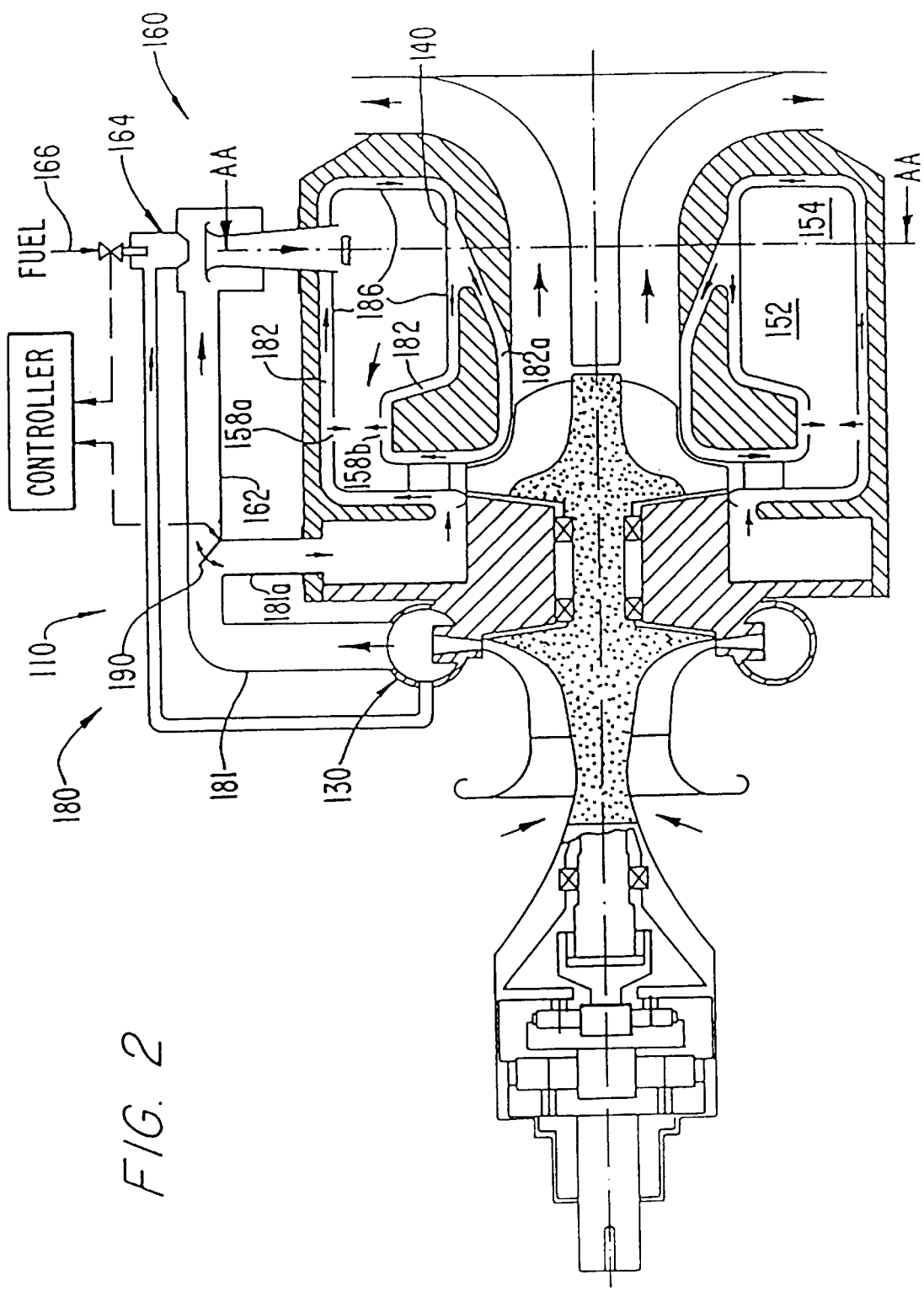
FIG. 2 is a schematic cross-section of a gas turbine engine module with an alternative version of the combustor system shown in FIG. 1A.

FIG. 2 discloses combustor system 110 having an alternate configuration for the compressed air conduit means. Components having the same or similar function relative to the embodiment in FIGS. 1A, 1B are given the same numeral but with a "100" base. In the compressed air conduit means designated generally as 180 in FIG. 2, a distribution conduit 181 is provided between compressed air collection plenum 130 and annular passageway 182 surrounding housing 140, and fuel/air premixer housing assembly 162 is directly connected to distribution conduit 181 upstream of passageway 182. Valve 190 is disposed at the connection between fuel/air premixer housing assembly 162 and distribution conduit 181 to positively divide the air flow into a first portion flowing to fuel/air premixer 160 and the remainder to passageway 182 via distribution conduit portion 181a. As compared with the embodiment in FIG. 1A, where substantially all of the compressed air portion flowing to the premixer was first used to cool at least a part of liner housing portion 86 defining combustion chamber 52, none of the compressed air portion flowing to fuel/air premixer 160 is used to cool portions 186 of housing 140 defining combustion zone 152. However, the FIG. 2 embodiment does allow for the direct control of the compressed air fractions flowing to the fuel/air premixer versus the compressed air flow fraction flowing to the dilution ports 158a and 158b. The configuration shown in FIG. 1A may be preferred nonetheless because of an ease of construction in assembly of the various components, principally the fuel/air premixer wherein the valve can be integrated directly with the fuel/air premixer housing, as will be discussed in more detail henceforth.

Further in accordance with the present invention, fuel conduit means is provided interconnecting the fuel supply and the premixer fuel receiving means, the fuel conduit means together with the premixer fuel receiving means establishing a flow path for all the fuel to the premixer. Fuel valve means is disposed in the fuel flow path for determining the fuel flow rate therein. As embodied herein, and with reference again to FIG. 1A, fuel line 66 interconnects fuel source 32 with fuel nozzle 64. Fuel valve 92 is disposed in fuel line 66 immediately upstream of fuel nozzle 64, which is depicted as being an "air-blast" type fuel nozzle particularly suitable for use with liquid fuels, as stated previously.

Still further in accordance with the present invention, the combustor system includes controller means operatively connected both to the compressed air valve means and the fuel valve means for essentially controlling the respective flow rates of the compressed air portion and the fuel delivered to the premixer to provide a preselected lean fuel/air ratio mixture through the inlet port to the combustion zone. As embodied herein and as depicted schematically in FIG. 1A, controller 94 which can be either mechanical or electric (e.g., a microprocessor) is interconnected with compressed air valve 90 to essentially control the flow rate of the compressed air flowing directly to venturi inlet 70. While a small portion (typically 5% or less), of the total compressed air flowing to fuel/air premixer 60 (,an travel through conduit 88 when an "air-blast" nozzle is utilized, the control provided by valve 90 of the remaining 95+% of the compressed air flow is expected to achieve adequate overall fuel/air ratio control. Moreover, for situations utilizing gaseous fuel, such as natural gas as provided in the Example to be discussed hereinafter, conduit 88 could be eliminated such that all of the compressed air flow to the fuel/air premixer will be under the control of the compressed air flow valve.

Also as depicted in FIG. 1A, controller 94 is operatively connected to fuel valve 92 to meter the fuel flow to fuel nozzle 64. As one skilled in the art would appreciate, controller 94 can act to control both the fuel flow and the compressed air flow to fuel/air premixer 60 to achieve a single preselected fuel/air ratio mixture over the entire operating range of the gas turbine engine module so that the mass flow of the combustible mixture would change as a function of the load. Or, alternatively, controller 94 can be configured to provide a sequence of preselected fuel/air ratio mixtures as a function of load. One skilled in the art would be able to select and adapt a suitable controller for a particular application based on the present disclosure and the general knowledge in the art.

In operation, and with reference to FIGS. 1A and 1B, compressed air from compressed air receiving means 30 is channeled via passageway/envelope 82 over the outside surface of housing 40 for cooling housing 40, and particularly portions 86 which surround combustion zone 54. A portion of the compressed air flowing in passageway 82 is admitted to plenum 84 and then flows to fuel/air premixer 60 via the interconnection between fuel/air premixer housing assembly 62 and 84 as controlled by compressed air valve 90 via controller 94. In venturi 68, the compressed air portion is mixed with the fuel from fuel nozzle 64, possibly with a small additional portion of compressed air if nozzle 64a is a "air-blast" type nozzle, and is injected along the venturi axis 74 through inlet port 43 and into combustion zone 54 of combustion chamber 52.

As shown in FIG. 1B, swirling flow and combustion is provided in combustion zone 54 by locating venturi axis 74 tangentially with respect to axis 42 of the housing. The direction of orientation of the venturi axis 74 is chosen to give a specific angular direction (clockwise or counterclockwise) with respect to the direction of rotation of the turbine in order to provide some aerodynamic unloading of the inlet guide vanes. For the configuration depicted in FIGS. 1A and 1B where the fuel/air mixture is admitted to achieve a clockwise swirling combustion in combustion zone 54 as viewed in the direction AA, the direction of rotation of turbine 20 also would be in the clockwise direction. After combustion of the fuel/air mixture in zone 54, the hot exhaust gases pass to dilution zone 56 where dilution air from dilution ports 58a, 58b reduce the average temperature of the exhaust before it is ducted via channel 50 past inlet guide vanes 34 to turbine 20 for work-producing expansion.

The control of combustion afforded by combustion system 10 in accordance with -the present invention through the complete mixing of the fuel and air outside the combustion chamber in the fuel/air premixer, including complete vaporization of the fuel if liquid fuel is used, together with the control of the fuel/air ratio of the mixture delivered to the combustion chamber allows for significant reductions in $NO_x$ levels and the levels, of unburned fuel and fuel by-products, as mentioned earlier. Furthermore, the utilization of essentially the total amount of compressed air flow to either combust the fuel or to dilute the exhaust gases upstream of the turbine provides considerable reduction of peak combustor temperatures resulting in longer life for combustor liners compared to conventional combustor designs.

As previously mentioned, the preferred fuel/air premixer of the present invention includes a compressed air receiving means, a venturi having an inlet operatively connected to the compressed air receiving means with air flow smoothing means, a fuel receiving means including a nozzle with an exit positioned to deliver a spray of fuel into the venturi inlet substantially along the venturi axis, and valve means associated with the compressed air receiving means for determining the compressed air flow rate to the venturi inlet. As embodied herein and with reference to FIG. 3A, fuel/air premixer 260 includes air receiving means in the form of housing assembly 262. Components having a like or similar function to those disclosed in the embodiments of FIGS. 1A and 1B will be designated by the same numeral but with a "200" base. Housing assembly 262, in turn, includes housing 300 and housing support 302 for mounting housing 300 on pressure vessel 214 of gas turbine engine module 212. Housing support 302 is hollow and, in addition to supporting housing 300 and the components contained therein, acts to channel compressed air from plenum 284 to housing 300. In the construction shown in FIG. 3A, cooling shroud member 303 is positioned between combustion chamber liner housing 240 and pressure vessel 214 for establishing the flow path 282, at least in the vicinity of portions 286 of housing 240 that define the boundary of the combustion zone 254. Shroud member 303 also defines With pressure vessel 214, plenum 284 for collecting the compressed air portion for eventual transmission to housing 300 via housing support 302.

Figure 3A:
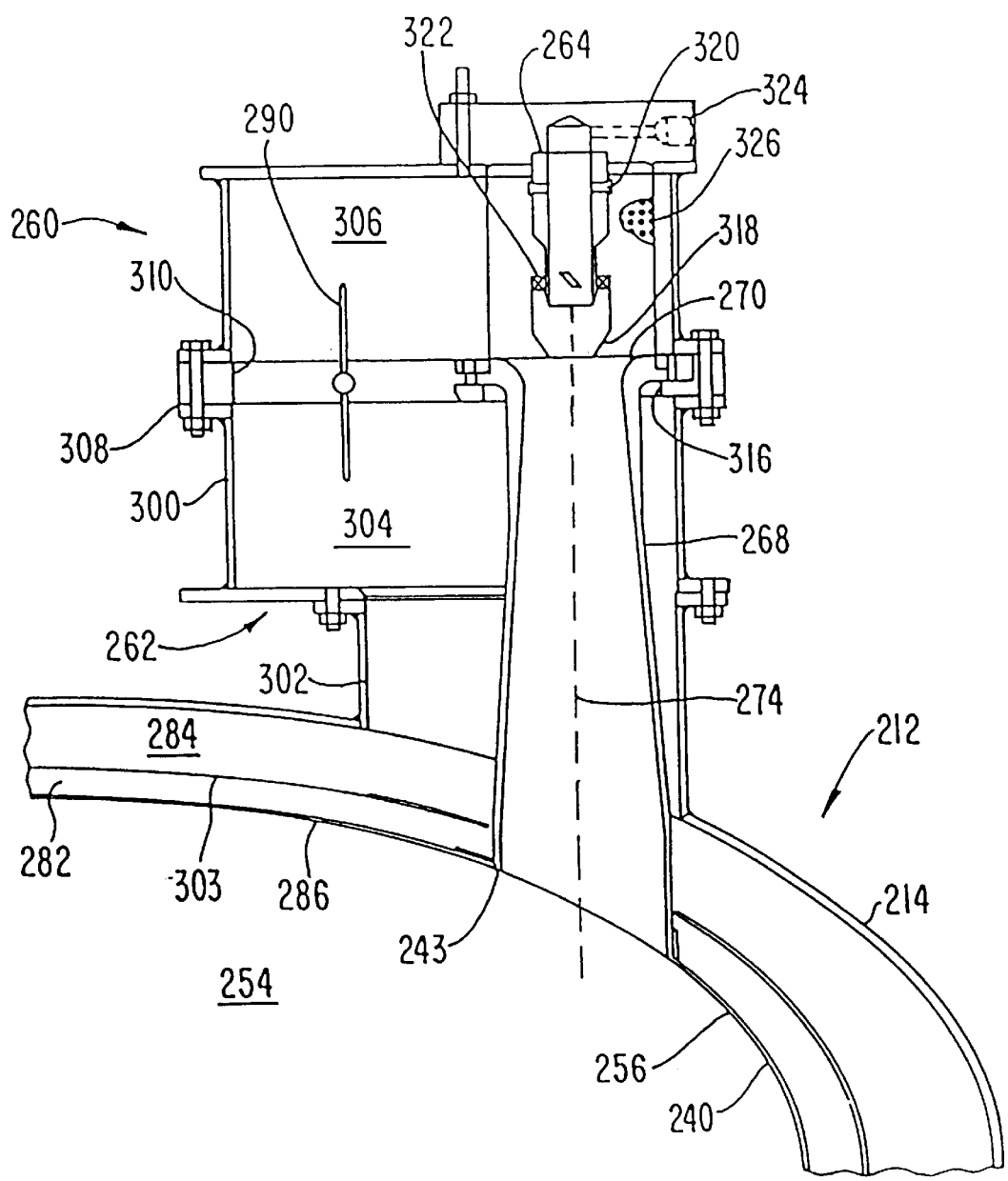
FIGS. 3A–3C are detailed cross-sectional views of a test version of the preferred fuel/air premixer component of the apparatus shown in FIG. 1A.

With continued reference to FIG. 3A, fuel/air premixer housing 300 is divided into upstream and downstream compartments 304, 306 respectively by divider plate 308. Aperture 310 is provided in divider plate 308, and a butterfly-type valve plate 290 is mounted for rotation in aperture 310. In the FIG. 3A embodiment, he orientation of valve plate 290 in aperture 310 is controlled through control arm 312 (see FIG. 3B) to provide a selective degree of obstruction and, hence, pressure drop. In the orientation of valve plate 290 shown in FIGS. 3B and 3C, a minimum amount of obstruction occurs with valve plate 290 being oriented perpendicular to the divider plate 308, corresponding to a "zero" setting of the angular calibration plate 314 shown in FIG. 3C. A position of control rod 312 corresponding to either "9" position on indicator 314 would result in the greatest amount of obstruction and pressure drop in the compressed air portion flowing through aperture 310. As one skilled in the art would realize, the degree of obstruction and thus control of the compressed air flow between upstream compartment 304 and downstream compartment 306 could be varied by changing the angular orientation of control rod 312 between the "zero" and "9" positions, thereby controlling the compressed air flow rate to the balance of the fuel/air premixer 260 which will now be described in more detail.

Divider plate 308 includes an additional aperture 316 in which is mounted inlet 270 of venturi 268. Venturi inlet 270 is configured and mounted to divider plate 308 such that a smooth transition exists between the upper planar surface of divider plate 308 and the inner surface of venturi inlet 270. Venturi 268 extends through upstream housing compartment 304, housing support 302, past pressure vessel 214, combustion chamber liner 303, and connects to housing 240 at the location of inlet port 243. As described previously in relation to the embodiment depicted in FIG. 1A, the venturi axis 274 which corresponds generally to the flow direction of the fuel/air mixture in venturi 268 is oriented to provide a substantially tangential admission direction with respect to the axis (not shown) of annular combustion chamber housing 240.

With continued reference to FIG. 3A, fuel nozzle 264 is mounted in downstream compartment 306 with the fuel nozzle exit 318 positioned to deliver a spray of fuel into venturi inlet 270 along venturi axis 274. Fuel nozzle 264 is of the "swirling" spray the which utilizes ports 320 and swirl vanes 322 to channel some of the compressed air swirl the fuel entering through fuel port 324 before releasing the fuel spray through exit 318. Also shown in FIG. 3A is perforated flow-smoothing element 326 positioned in the downstream compartment 306 and surrounding fuel nozzle exit 318 and venturi inlet 270, to avoid uneven velocities and separation in the venturi which otherwise could result in "flame holding" in the venturi. While a small pressure drop is introduced by its incorporation, the perforated element 326 has been found to provide increased stability for the compressed air flow from downstream compartment 306 past the fuel nozzle 264 and into venturi inlet 270, without any separation at the lip of venturi inlet 270.

Figure 3B:
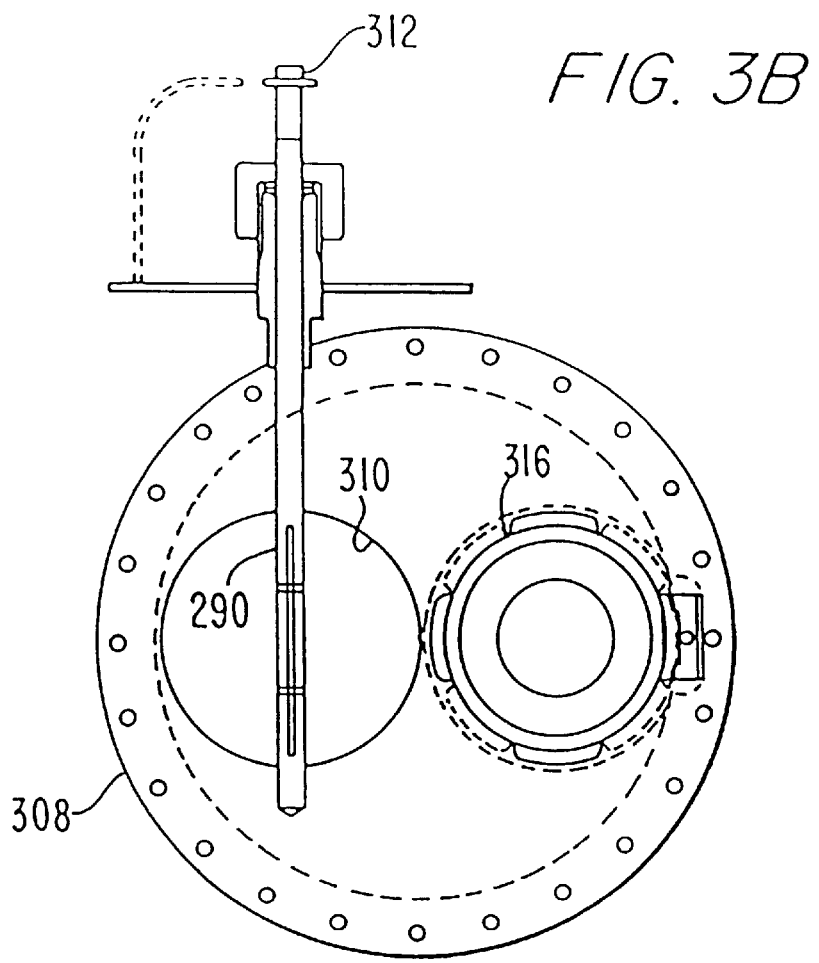
Figure 3C:
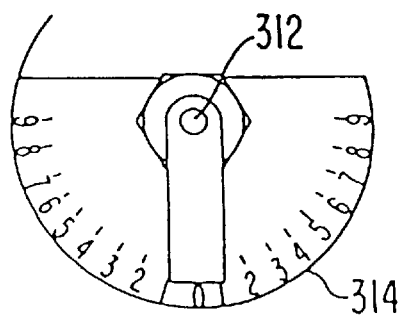
Figure 4:
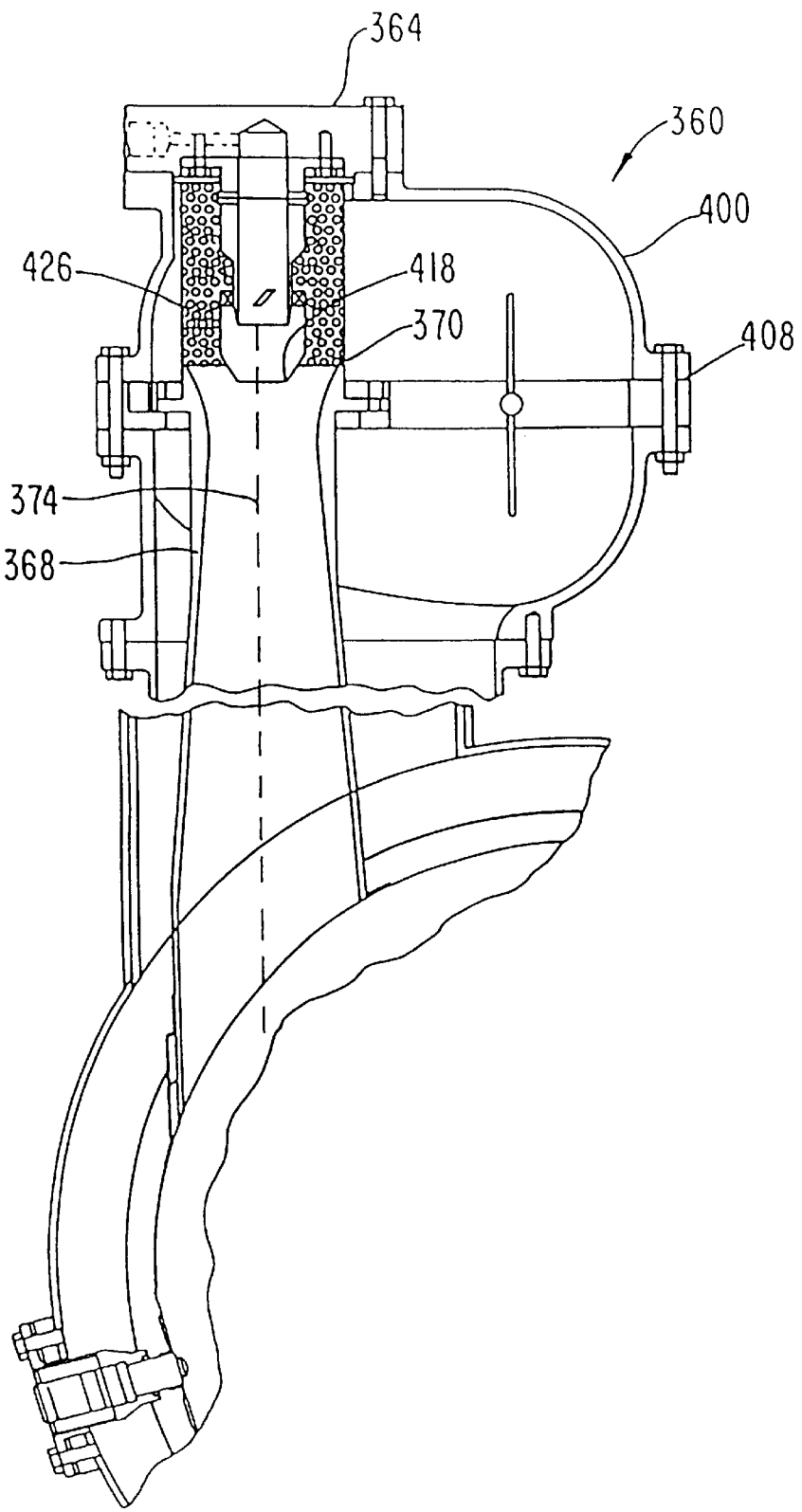
FIG. 4 is a detailed cross-sectional view of an engine version variation of the fuel/air premixer shown in FIGS. 3A–3C.

FIG. 4 shows a contemplated commercial variation of the preferred fuel/air premier depicted in FIGS. 3A–3C, which variation is designated generally by the numeral 360. Components having the same or similar function to those described in relation to the FIG. 1A, 1B embodiment are given the same numerals but with "300" base. Fuel/air premixer 360 includes a venturi 368 which has inlet 370 which extends slightly above the surface of divider plate 408. Also, fuel nozzle exit 418 extends a distance into venturi inlet 370. One skilled in the art would realize that the optimum performance of the fuel nozzle 364 in conjunction with the venturi 368 (as well as nozzle 264 and venturi 268 in the variation shown in FIGS. 3A–3C) may vary from application to application and that the positioning of fuel nozzle exit 418 along the venturi axis 374 in the vicinity of venturi inlet 370 may be adjusted to determine the optimum position. However, it is anticipated that perforated screen element 426 would provide flow stability for the FIG. 4 embodiment as well. Finally, the FIG. 4 embodiment incorporates contemplated refinements in the construction of the fuel/air premixer compared to the construction shown in FIG. 3A, such as the use of integral, bell-shaped housing 400.

Figure 5A:
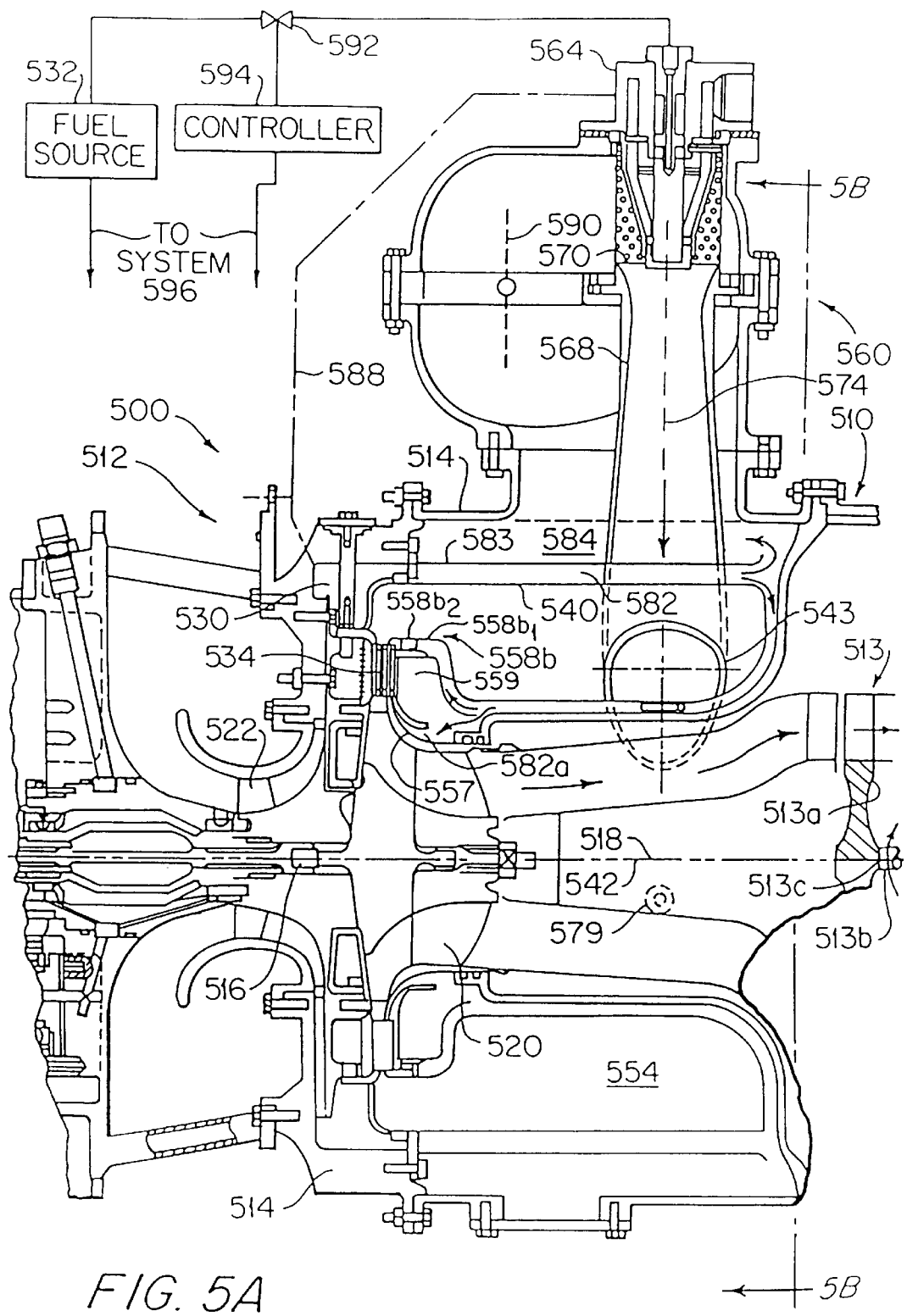
FIGS. 5A and 5B are, respectively, a schematic longitudinal cross section and a schematic axial cross section of another gas turbine engine module utilizing a combustor system made in accordance with the present invention.

As mentioned previously, certain aspects of the present invention advantageously can be adopted for applications such as gas turbine gas generator modules used in conjunction with free power turbines or free jet propulsion units, which gas generator modules may not require the use of a compressed air flow valve and associated controller functions, in contrast to the previously discussed embodiments depicted in FIGS. 1A and 2. FIG. 5A depicts schematically such an engine system constructed in accordance with the present invention and designated generally by the numeral 500. Engine 500 comprises gas turbine gas generator module 512, including combustor system 510 to be discussed in more detail hereinafter and free power turbine module 513. Free turbine module 513 includes free turbine 513*a* which is depicted as an axial turbine, but could be pure radial or mixed axial-radial as the application may require. In comparison with the FIG. 1A engine system embodiment where power was extracted from gearing 24 connected to shaft 16, power is taken from the engine system 500 in the FIG. 5A embodiment via gearing associated with free turbine shaft 513*b*. Although shown coaxial with axis 518 of the gas generator module, rotational axis 513*c* of free power turbine 513 could be angularly displaced to meet the requirements of the overall system 500.

In the subsequent discussion, like components relative to the embodiment in FIG. 1A will be given the identical numeral but with a "500" prefix.

In accordance with the present invention gas turbine gas generator module 512 includes a mechanically independent spool, namely centrifugal compressor 522 and radial turbine 520 mounted for dependent rotation on shaft 516, inside pressure housing 514. Thus, shaft 516 can rotate independently of free turbine shaft 513*b* although gas generator 512 and free turbine module 513 are interconnected in the gas flow cycle. Module 512 also includes combustor system 510 with combustor liner housing 540 which is contained within pressure housing 514 and which receives premixed air/fuel from external premixer 560 through inlet port 543 along venturi axis 574. Venturi axis 574 is oriented tangentially with respect to axis 542 of annular combustor liner housing 540 to provide efficient, swirling combustion and also to partially unload inlet guide vanes 534, as discussed previously in relation to the FIG. 1A embodiment. See FIG. 5B.

Figure 5B:
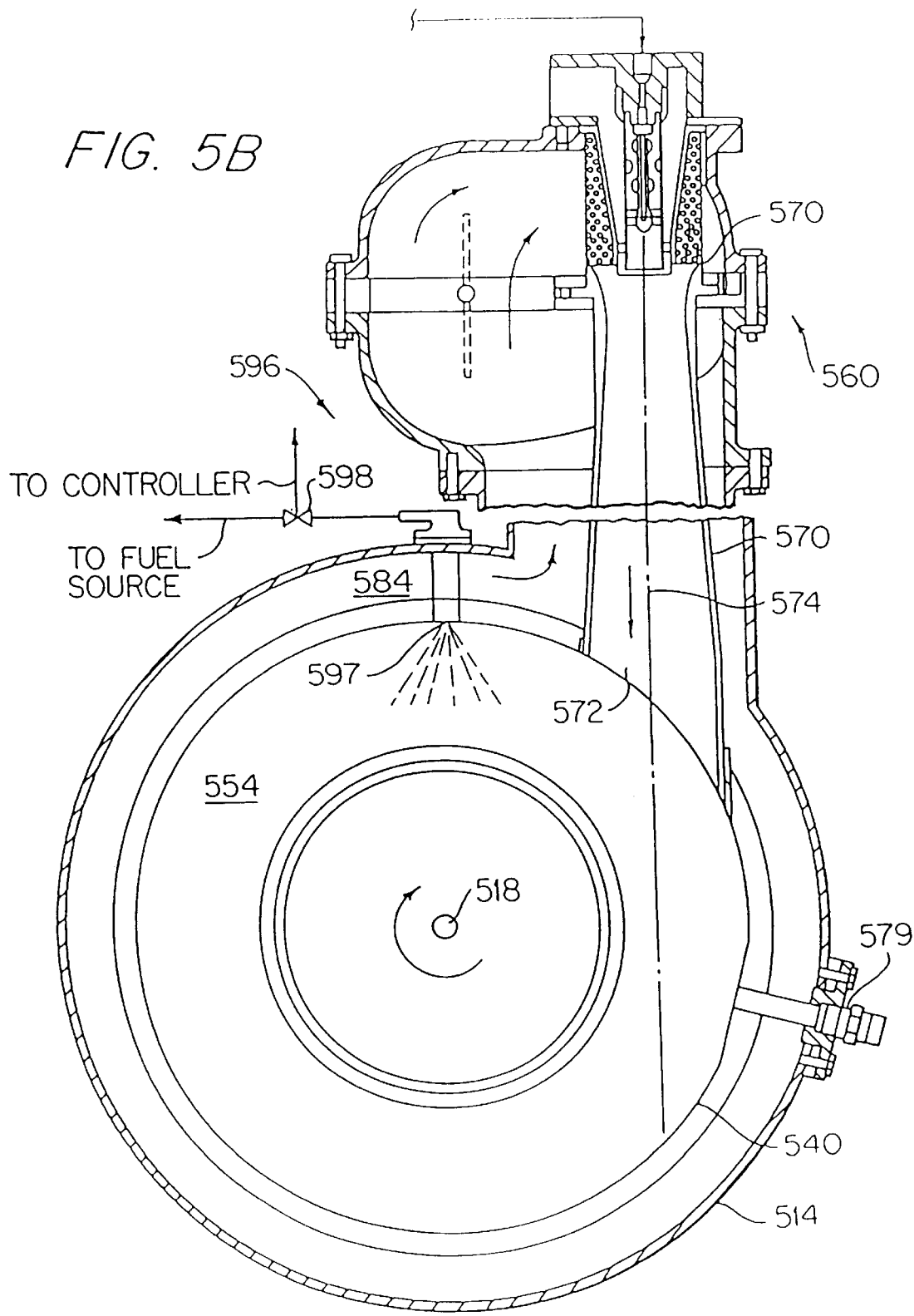

FIG. 5B also depicts the presently preferred position of ignitor 579, namely on liner housing 540 adjacent the intersection of venturi axis 574. While it may eventually be possible to locate the ignitor in a relatively cooler environment, such as in the premixer, and thereby prolong ignitor life and further decrease the number of penetrations in liner housing 540, the location depicted in FIG. 5B is expected to ensure light-off because of the low velocities of the fuel/air mixture in the annular chamber.

In the embodiment depicted in FIGS. 5A and 5B, housing liner 540 and pressure housing 514 cooperate to form passages for the compressed air flow from compressor plenum 530. Also included in this engine embodiment is annular cooling shroud 583 disposed between, and radially spaced from both, housing liner 540 and the circumferentially adjacent portion of pressure housing 514. As can be appreciated from the figures, cooling shroud 583 and housing liner 540 cooperate to form part of the passageway 582 for convectively cooling the combustor chamber defined by liner 540 while cooling shroud 583 and pressure housing 514 cooperate to form annular plenum 584 to collect the portion of the compressed air flow to be channeled to premixer 560 for mixing with the fuel. In the FIG. 5A embodiment, as in the embodiment shown in FIG. 1A, a portion of the compressed air is taken from the passageway leading from the compressor exit after providing convective cooling and is then channeled to the premixer for mixing with fuel, but the FIG. 5A arrangement can be made more structurally compact than the ring-shaped plenum 84 in FIG. 1A. Furthermore, cooling shroud 583 provides radiation shielding of the adjacent parts of pressure housing 514 from the relatively hot liner housing 540, allowing the use of less expensive materials and increasing the service life of the pressure housing.

The balance of the compressed air flow in passageway 582 is channeled through dilution apertures 558b. There are no dilution ports corresponding to the ports 58a in the FIG. 1A embodiment, but dilution ports 558b include two separate circumferential port sets 558$b_1$ and 558$b_2$. Divider 559 and the sizing of ports 558$b_1$ and 558$b_2$ causes dilution air flowing through ports 558$b_2$ to first flow through passageway 582a past turbine shroud 557. One skilled in the art would be able to perform the required sizing analysis to provide adequate distribution of the dilution air to achieve desired turbine shroud cooling. The elimination of film cooling provides for control over the fuel/air ratio in the combustion zone 554 and is one of the highly significant benefits and advantages of the present invention, as explained previously.

FIG. 5A also shows (in dotted line) conduit 588 leading from compressor exit plenum 530 to premixer 560 in the event "air-blast" type liquid fuel nozzle is utilized, for reasons explained previously. Although shown penetrating compressor plenum-exit 530 axially inclined in FIG. 5A for clarity, the inlet to conduit 588 would be tangential and in the axial plane of the compressor exit to capture the total dynamic head. One skilled in the art would be able to design an appropriate inlet configuration given the present description.

Aside from the small amount of compressed air that may be required to operate an air blast-type liquid fuel nozzle and, possibly, for inlet guide vane cooling, all of the compressed air is used to convectively cool at least part of liner housing 540 before being used for mixing with the fuel or for dilution. This construction optimizes the convective cooling capacity of the compressed air inventory. Although not shown, the present invention is also intended to include a gas generator variation corresponding to the FIG. 2 embodiment where the compressed air flow portion used for mixing with the fuel is not first used for convective cooling. The simplified construction of such a system might outweigh the reduction in cooling capacity and therefore be desired for certain applications.

As depicted in FIG. 5A, air is channeled from passageway 582 through annular plenum 584 for mixing directly with the fuel in premixer 560. FIG. 5A depicts compressed air valve 590 by broken lines to indicate that the valve is optional. It may be used for "fine tuning" the fuel/air ratio during operation, it may be preset to a fixed opening for operation, or it may be eliminated entirely, for the following reason. In engine system 510, the speed of compressor 522 and thus the compressed air flow rate is essentially proportional to the fuel flow over the operating range. Hence, gross control of the fuel/air ratio to a preselected lean value can be achieved automatically. The function of controller 594 acting to control fuel flow to fuel nozzle 564 from source 532 through fuel valve 592 thus becomes similar to that of a conventional throttle responsive to power demands.

While premixer 560 channels all the fuel/air mixture to combustion zone 554 required over the intended operating range of engine system 510, an auxiliary fuel supply system such as system 596 depicted in FIG. 5B may be used to provide a richer mixture for start-up and idle conditions. System 596 includes a conventional fuel spray nozzle 597 fed from fuel source 532 (see FIG. 5A), and the auxiliary fuel flow rate can be controlled by controller 594 through valve 598. In the disclosed embodiment, spray nozzle 597 is positioned to penetrate liner housing 540 adjacent venturi outlet 572 and disposed radially. However, nozzle 597 can be positioned in an opposed tangential orientation relative to venturi 570 (not shown) to enhance mixing with the fuel/air mixture entering through venturi 570. Other positions, constructions and orientations of spray nozzle 597 are, of course, possible and are considered to fall within the general teachings herein.

Figure 6:
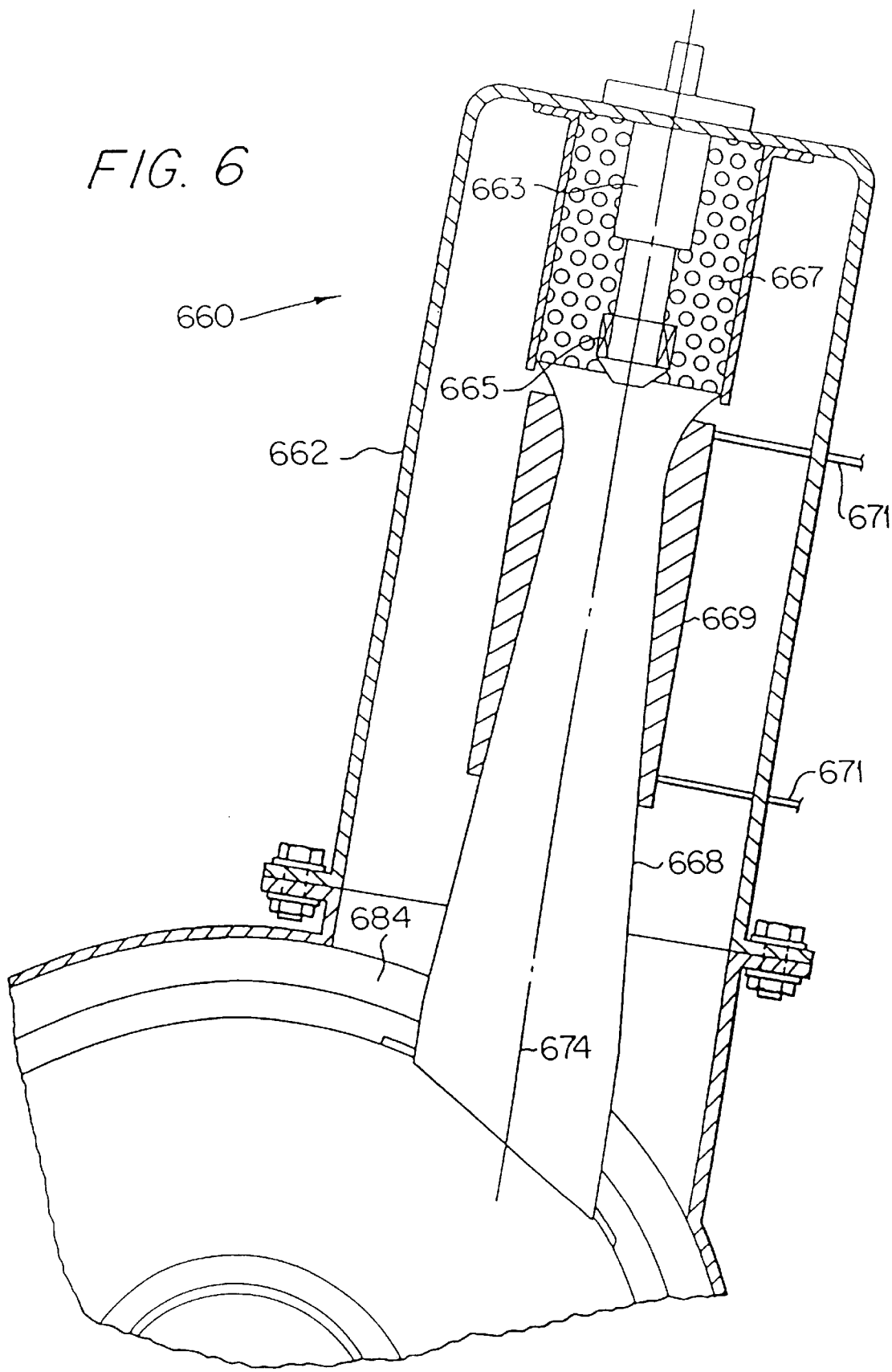
FIG. 6 is a schematic cross-section of an alternative premixer construction without an integrated compressed air flow valve, for use in the gas turbine engine module shown in FIG. 5.

FIG. 6 is a schematic of an alternative "valve-less" premixer design which could be used in engine system 510, and which is designated generally by the numeral 660. Premixer 660 includes housing 662, fuel nozzle 663 which is of the type having peripheral swirl vanes 665, and venturi 668 oriented with venturi axis 674 tangential to the combustor axis (not shown). Also, perforated flow-smoothing member 667 surrounds nozzle 664 and the entrance to venturi 668, for reasons explained previously in relation to the corresponding components in the "valved" embodiment in FIG. 3A. Premixer 660 additionally includes heating means such as electric resistance heater jacket 669 surrounding the throat area of venturi 668 and operatively connected to a power source (not shown) via electrical leads 671. During start up and using liquid fuels, a film of fuel tends to collect on the venturi inner surface. Heater jacket 669 augments vaporization of this fuel film and thus promotes the overall mixing of the fuel and air in the premixer. During operation, the temperature of the compressed air portion flowing past the outer surface of venturi 668 from plenum 684 may provide sufficient heat for vaporizing a liquid film, or prevent the formation of a liquid fuel film altogether, thereby dispensing with the need for continued activation of heating jacket 669.

FIG. 7 schematically depicts yet another engine embodiment that may advantageously utilize the combustor of the present invention, namely, a gas turbine engine system such as described in my previous patent U.S. Pat. No. 5,081,832, the disclosure of which is hereby incorporated by reference. In the FIG. 7 embodiment, engine system 700 includes high pressure spool 711 and mechanically independent low pressure spool 709. Low pressure spool 709 includes low pressure compressor 701 which is driven through shaft 702 by low pressure turbine 703. The compressed air exiting low pressure compressor 701 flows through diffuses 704 and enters high pressure compressor 722 for further compression. As components of high pressure spool 711 high pressure compressor 722 is driven by high pressure turbine 720 via shaft 716. Gases exhausted from high pressure turbine 720 are diffused in diffuser 705 and then expanded in low pressure turbine 703. For reasons explained more fully in U.S. Pat. No. 5,081,832, net power is taken from engine system 700 via gearing 724 connected to shaft 716 of high pressure spool 711. Low pressure spool 709 is used principally to supply pre-compressed air to high pressure spool 711 and possibly to drive engine support systems (e.g., lubrication).

As seen in FIG. 7, engine system 700 includes combustor system 710 to provide hot combustion gases to high pressure turbine 720 by combusting fuel with a portion of the compressed air from high pressure compressor 722. Importantly, combustor system 710 uses external premixer 760 which includes fuel nozzle 764 (which may be an "air-blast" type receiving compressed air directly from compressor 722 via conduit 788 with a tangential inlet-shown dotted) and venturi 768 to supply fully premixed fuel/air tangentially to annular combustion zone 754 defined by liner housing 740. Cooling shroud 783 and liner housing 740 cooperate to define part of convective cooling passageway 782, while cooling shroud 783 and the circumferentially adjacent portion of pressure housing 714 cooperate to form annular plenum 784 to channel a portion of the compressed air to premixer 760. The balance of the compressed air flow is used for additional convective cooling and finally dilution, using a configuration and construction similar to that shown in FIG. 5A.

However, the engine system configuration shown in FIG. 7 is intended for producing power at essentially constant high pressure spool shaft speed. Like the FIG. 1A embodiment, the total compressed air flow rate will not automatically adjust to a changed fuel flow in the manner of gas generator module 512 in the FIG. 5A embodiment. As a result, combustor system 710 specifically includes compressed air valve 790 integrated with premixer 760 and under the control or controller 794, which also controls fuel valve 792, to achieve a preselected lean fuel/air ratio. It is understood that, although not shown, the FIG. 7 embodiment could include features described in relation to the other embodiments, including a liner-mounted ignitor, auxiliary fuel spray system, staged dilution ports, etc.

Figure 8A:
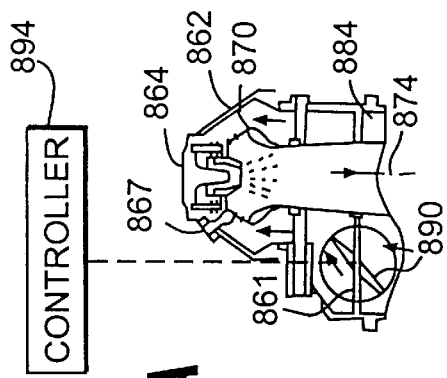
FIG. 8A is a schematic cross-section of the premixer assembly taken along line 8A—8A of FIG. 8.
Figure 8:
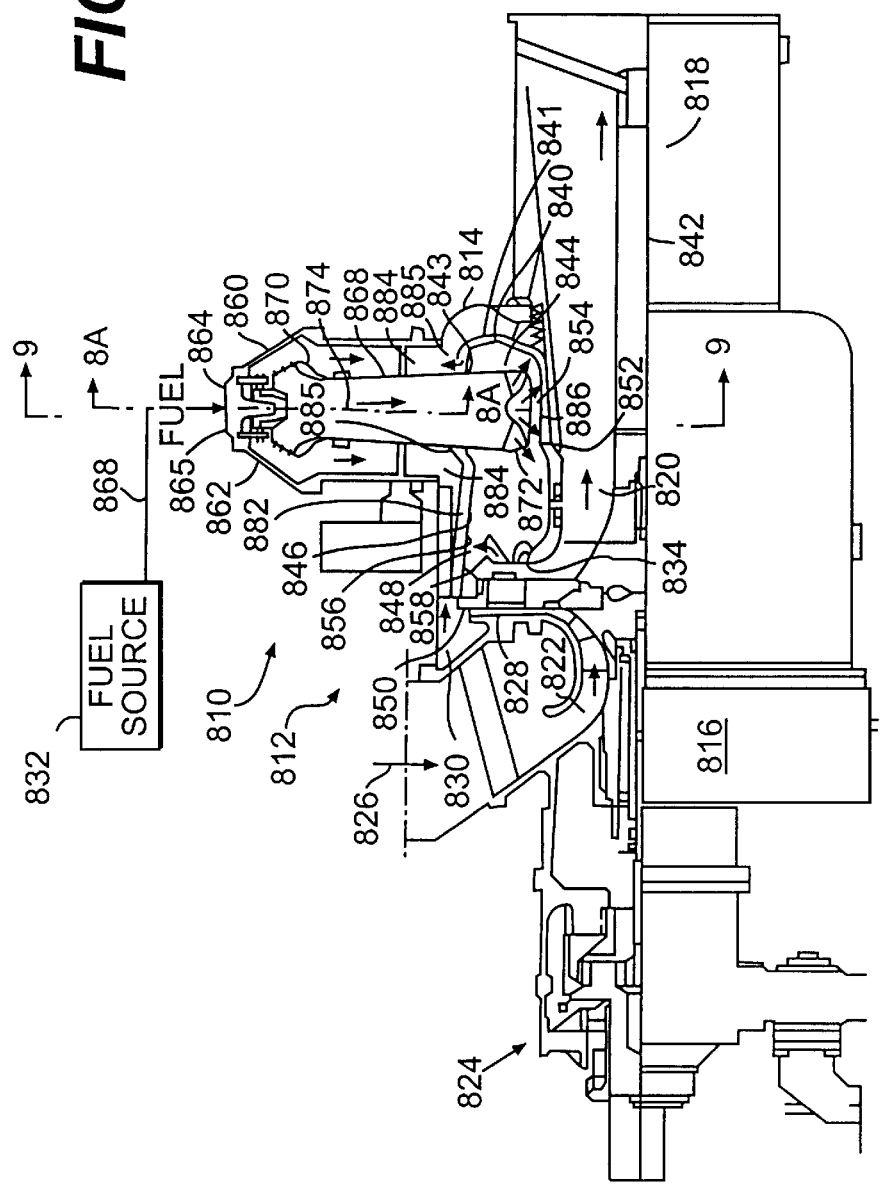
FIG. 8 is a schematic cross-section of yet another gas turbine engine module made in accordance with the present invention.

FIG. 8 schematically depicts yet another engine embodiment that advantageously utilizes the present invention. With initial reference to FIG. 8, a combustor system made in accordance with the present invention is shown and designated generally by the numeral 810. (Note, the upper portion of combustor system 810 is a cut-away view, illustrating the upper cross-sectional half of the system.) System 810 is depicted as being used in conjunction with radial gas turbine engine module 812. Gas turbine engine module 812 includes a pressure housing 814 within which is mounted shaft assembly 816 rotatable about axis 818. Mounted on one end of shaft assembly 816 is radial turbine 820 for driving centrifugal compressor 822 mounted at the opposed end of shaft assembly 816. In the configuration depicted in FIG. 8, power from gas turbine engine module 812 is taken out through a mechanical coupling arrangement shown generally at 824 adjacent centrifugal compressor 822. However, the combustor system of the present invention can be utilized in a gas generator in association e.g., with a "free power turbine," a "free-jet" propulsion unit, or any other turbine engine system version as one skilled in the art would immediately realize. Also, the present invention is not limited to use in a radial gas turbine engine or gas generator module but, at least in its broadest extent, could advantageously be used with axial or mixed axial-radial gas turbine engines and gas generator modules as well.

With continued reference to FIG. 8, gas turbine engine module 812 operates generally as follows. Air enters centrifugal compressor 822 in a direction designated by the arrows 826, is centrifugally accelerated to increase its velocity, whereupon it enters diffuser 828 to increase static pressure. The compressed air exiting diffuser 828 is collected in a plenum 830. Thereafter, a portion of the compressed air from plenum 830 is mixed with fuel from a fuel source 832 by means of premixer assembly 860 of combustor system 810, to be described in more detail hereinafter, to produce hot exhaust gases which flow past inlet guide vanes 834 to radial turbine 820, where power is extracted. The exhaust gases from turbine 820 are ducted to the atmosphere or to a subsequent engine module. For example, in the case of free power turbine arrangement, the gases exiting turbine 820 would be ducted to the free power turbine for extraction of further power.

In accordance with the present invention, the combustor system includes a cylindrical combustor liner defining a combustion chamber, the liner having an axis and having one or more inlets adjacent one axial chamber end. The portion of the chamber adjacent the one axial chamber end comprises a single stage combustion zone. As embodied herein, and with continued reference to FIG. 8, combustor system 810 includes annular combustor liner 840 which is generally toroidal in shape. Housing 840 is contained within pressure vessel 814 and defines an axis 842 essentially coincident with gas turbine engine module axis 818. Liner 840 is closed at axial end 844 except for inlet 843, but is open at axial end 846 to form an annular combustor exit 848. (If multiple premixers are utilized, it should be understood that additional inlets may be provided in the liner to accommodate the added premixers.) Combustor exit 848 is in flow communication with radial turbine 820 through channel 850 past inlet guide vanes 834.

With continued reference to FIG. 8, toroidal chamber 852 defined by liner 840 comprises two generally axial sections or portions with different functions. Region 854 adjacent axial end 844 comprises a single stage combustion zone (e.g., a combustion volume) and region 856 adjacent liner end 846, comprises a dilution zone. A plurality of ports 858 are formed in the outer peripheral surface of liner 840 and open into dilution zone 856. Dilution ports 858 provide for the introduction of compressed air into the dilution zone 856 of combustion chamber 852 from a compressed air conduit, which will be described in more detail hereinafter. Alternatively, compressed air may be delivered into the dilution zone through a second set of dilution ports (not shown) provided as a series of apertures formed in an inner peripheral surface of liner 840 by redirecting compressed air from the premixer into the dilution zone.

Further in accordance with the present invention, one or more fuel/air premixer assemblies are each disposed relative the cylindrical liner and is provided for mixing a portion of the compressed air flow with fuel to provide a fuel/air mixture and for delivering the mixture to the combustion zone through the respective liner inlet. The fuel/air premixer assembly includes an air inlet for receiving the compressed air, a fuel inlet for receiving the fuel and also a mixing tube for flow-smoothing the received compressed air and for mixing the received compressed air and fuel. Essentially all of the air used during combustion is delivered to the combustion zone through one or more fuel/air premixer assemblies. The combustion zone is otherwise sealed off from receiving compressed air except through the premixer assembly.

As embodied herein and with reference to FIGS. 8 and 8A, combustion system 810 further includes a single fuel/air premixer assembly designated generally by the numeral 860. Premixer assembly 860 includes housing assembly 862 for receiving the compressed air through an air inlet 861 from an air conduit (described later), and a fuel nozzle 864 for receiving fuel through a fuel inlet 865 from fuel source 832 via fuel line 866. Fuel nozzle 864 depicted in FIG. 8 is an "air-blast" type fuel nozzle that mixes the fuel with swirling compressed air that is especially advantageous for use with liquid fuel to provide atomization and thus enhance vaporization. However, use of an "air blast" nozzle with gaseous fuel can provide benefits in terms of providing an initial mixing of the fuel with air prior to admission to the venturi element. Thus, the combustion system of the present invention is not restricted to the use of liquid fuel or an "air-blast" fuel nozzle, but gaseous fuel and other types of fuel nozzles, such as other swirling-type nozzles, can be used as well. As shown in FIG. 8A, an auxiliary fuel nozzle 867 may be provided for use during the start-up sequence of combustor system 810.

In accordance with the present invention, the mixing tube, such as a venturi, has a flow axis substantially radially disposed with respect to the combustion liner axis, an inlet adjacent one mixing tube axial end, and a nozzle assembly at the opposite mixing tube axial end. The mixing tube inlet is flow connected to the premixer air inlet and the premixer fuel inlet. The mixing tube is connected to the liner inlet, and the nozzle assembly extends into the combustion chamber along the flow axis to deliver the fuel/air mixture within the combustion zone.

As embodied herein, and with continued reference to FIG. 8, premixer assembly 860 further includes a mixing chamber in the form of a venturi-type mixing tube 868 having mixing tube inlet 870 disposed within fuel/air premixer housing assembly 862 and connected to liner 840 at inlet 843. Further, mixing tube 868 has a nozzle assembly 872 for delivering fuel/air mixture into the combustion chamber that is connected to a portion of the mixing tube that extends into combustion zone 854. Mixing tube 868 defines a flow axis 874, and fuel nozzle 864 is positioned to deliver a fuel spray into mixing tube inlet 870 substantially along axis 874. The cross-sectional flow area and dimensions of mixing tube 868 are chosen to provide sufficient residence time to obtain vaporization and mixing of the fuel and compressed air within the mixing tube and to direct the flow of the resulting mixture along mixing tube axis 874 to nozzle assembly 872. Preferably, the residence time of particulate matter in the mixing tube is between 2–8 milliseconds. Although the preferred mixing tube depicted in FIG. 8 is a venturi-type mixing tube 868, one skilled in the art would appreciate that other geometrical configurations are possible, including conically or cylindrically shaped mixing tubes, for example.

As further shown in FIG. 8, compressed air conduit includes generally annular cooling passageway 882 disposed between liner 840 and a second, outer annular liner 841. Passageway 882 extends between compressed air plenum 830 and dilution ports 858. Fuel/air premixer housing assembly 862 is connected to receive compressed air from orifices 885 in liner 841 for eventual communication to the mixing tube inlet 870 by delivering the air through plenum 884 and valve 890 (discussed later).

As can be appreciated from the schematic in FIG. 8, passageway 882 is configured such that the compressed air flowing therein provides cooling for liner 840, particularly liner portion 886 immediately surrounding the combustion zone 854. Portion 886 of liner 840 is constructed for convection cooling only, with no film-cooling. That is, in portion 886 of liner 840, the liner acts to seal off the compressed air flowing in passageway 882 from the fuel/air mixture being combusted in combustion zone 854. Passageway 882 envelopes combustion chamber 852 to provide convection cooling and also to supply compressed air to dilution ports 858. This construction provides for control of the fuel/air ratio of the mixture in combustion zone 854 and permits operation as a "single stage combustor" with a desired lean fuel/air ratio. Such an operation can yield low levels of $NO_x$ and unburned fuel and fuel by-product levels.

Further shown in FIG. 8A, a valve 890 is positioned in fuel/air premixer housing assembly 862 for determining the rate of compressed air flow from plenum 884 to mixing tube inlet 870. Valve 890 is continuously adjustable, and a suitable construction of valve 890 can vary, but is depicted as a butterfly-type. When the valve opening changes, the pressure drop over the premixer changes, resulting in an increase or decrease of air mass flow. A controller 894 (depicted schematically), which for example, can include a microprocessor, is interconnected with valve 890 to essentially control the flow rate of the compressed air flowing directly to mixing tube inlet 870. Controller 894 is also operatively connected to a fuel valve to meter the fuel flow to fuel nozzle 864. As one skilled in the art would appreciate, controller 894 can act to control both the fuel flow and the compressed air flow to premixer assembly 860 to achieve preselected fuel/air ratios—e.g., preselected in accordance with atmospheric conditions, operating conditions, and fuel-type—over the entire operating range of the gas turbine engine module. Controller 894 could provide infinitely variable fuel/air ratios or step-type ratios. One skilled in the art would be able to select and adapt a suitable controller for a particular application based on the present disclosure and the general knowledge in the art.

In further accordance with the present invention, the nozzle assembly extends along the mixing tube flow axis into the combustion chamber and has one or more ports for distributing the fuel/air mixture within the combustion zone. The nozzle assembly further may have at least one channel for each nozzle assembly port, wherein each channel is angled away from the mixing tube flow axis and terminates at a nozzle assembly port For distributing the fuel/air mixture within the combustion zone.

Figure 9:
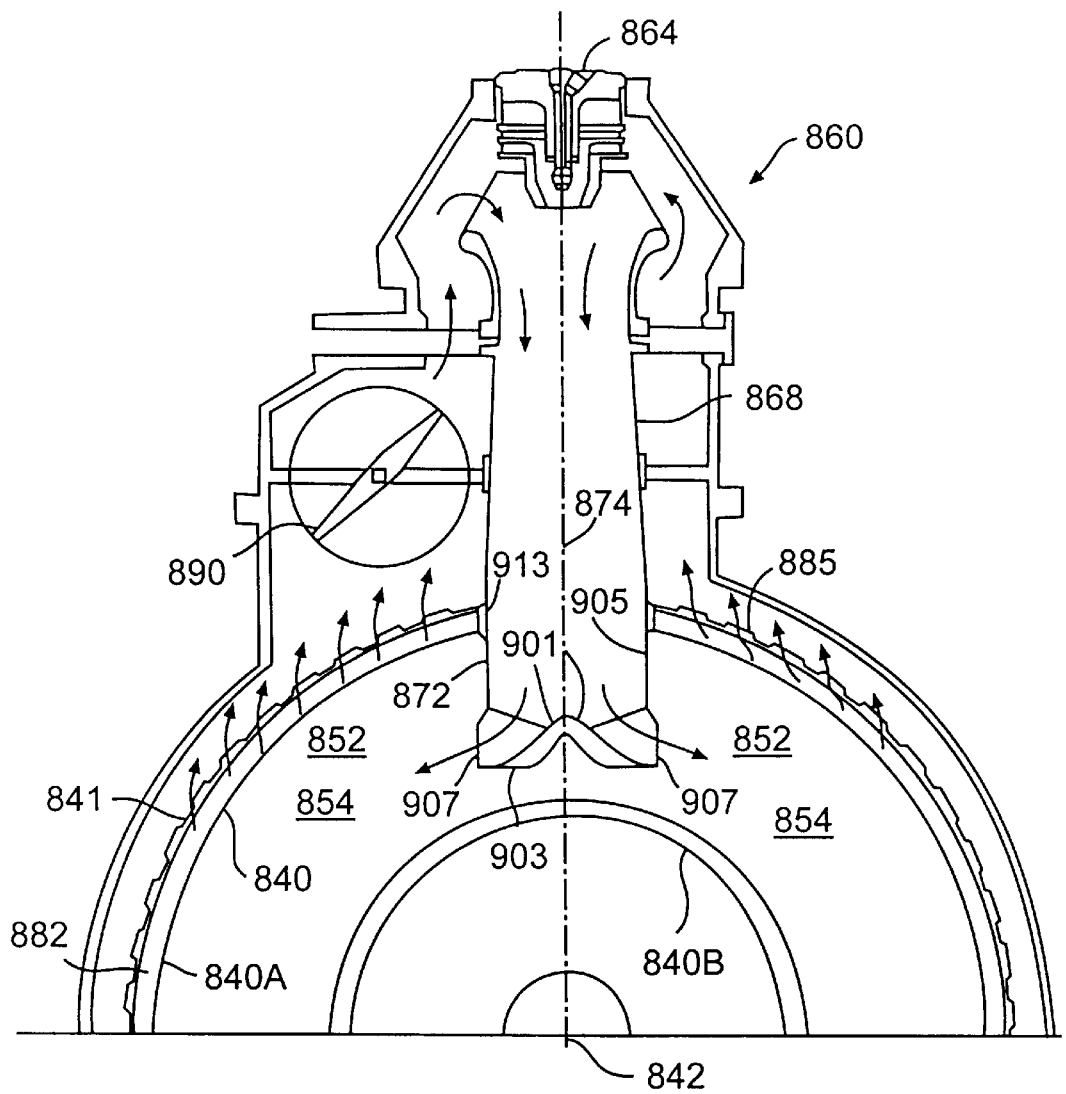
FIG. 9 is a schematic cross-section of the premixer assembly taken along line 9—9 of FIG. 8.
Figure 11:
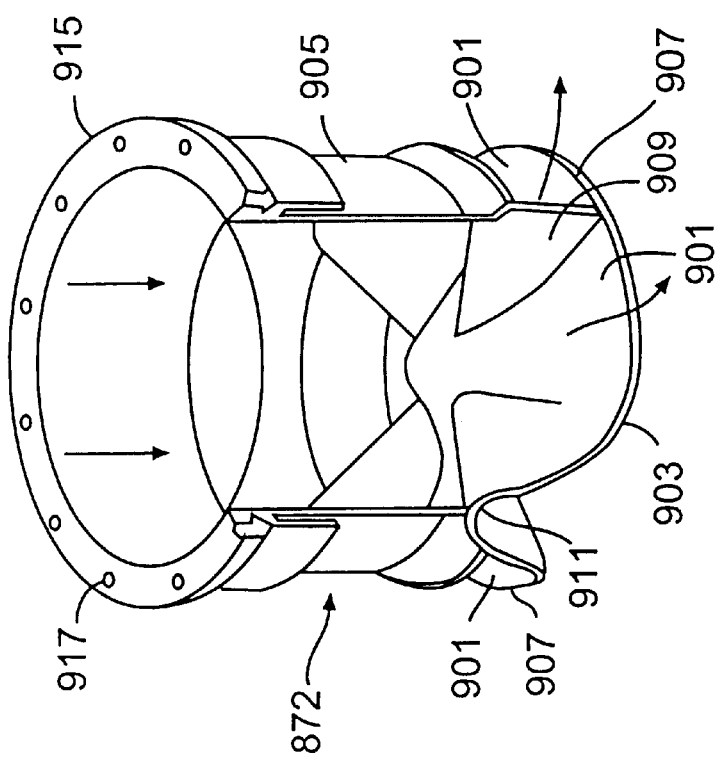
FIG. 11 is a perspective cross-sectional view of the nozzle assembly of FIG. 10.
Figure 10:
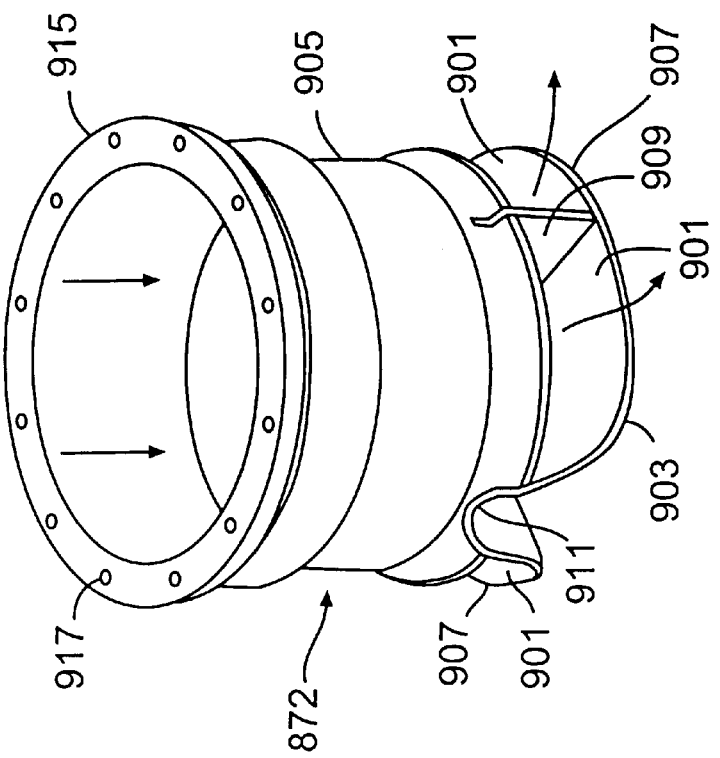
FIG. 10 is a perspective view of a nozzle assembly made in accordance with the present invention.

As embodied herein, and with reference to FIGS. 9–11, nozzle assembly 872 is positioned within combustion chamber 852, and has channels 901 defined by the geometrical configuration of end cap 903 and interior side walls 905 of nozzle assembly 872. Side walls 905 can be configured as an extension member for mixing tube 868 or can have different geometrical shape. Nozzle assembly 872 further includes ports 907 defined by end cap 903 and side walls 905. Ports 907 are in flow communication with channels 901 and distribute fuel/air mixture within combustion zone 854. Fins 909 are additionally provided to connect end cap 903 to side walls 905.

Due to the beveled or sloped surfaces of the nozzle assembly (and in particular channels 901), the flow of the fuel/air mixture is directed away from flow axis 874, as can be seen by the arrows in FIG. 11. That is, the flow of the fuel/air mixture can be diverted in a desired direction by utilizing surfaces of varying geometrical orientations. Although several channels and nozzle assembly ports are depicted, it is understood that the present invention can be achieved by utilizing only a single channel and associated port. However, at least two ports for delivering the fuel/air mixture in opposed angular directions relative to the liner axis is particularly beneficial in utilizing the overall combustion volume.

Further, the structural components of the nozzle assembly (and in particular channels 901) can be configured to direct the fuel/air mixture into the combustion zone in a variety directions, with the flow preferably not impinging the walls of the combustion liner. For example, channels 901 of the nozzle assembly 872 could be configured so that the fuel/air mixture flows into the combustion zone in substantially radial or mixed radial-axial directions away from the mixing tube flow axis. Further, the flow could be directed multiple directions relative to the liner axis, e.g., along at least two generally opposed, substantially tangential angular directions relative to the combustion chamber liner axis as is shown by the arrows in FIG. 9. Moreover, the channels 901 could also be configured to direct flow in more than two directions relative to the mixing tube axis, such as is depicted in FIGS. 10 and 11.

It should be further understood that the aforementioned geometry of nozzle assembly 872 advantageously provides a flame holding effect by causing the sudden expansion and recirculation of the exiting fuel/air mixture in the vicinity of end cap 903. That is, the configuration of end cap 903, for example, provides areas 911 for the circulating fuel/air mixture to burn outside nozzle assembly 872 adjacent ports 907. Flame holding is beneficial in providing a stable flame near ports 907 in order to maintain a steady flame front to stabilize combustion during the varying operating conditions.

Preferably, the total cross-sectional area of ports 907 are collectively about 70–90% of the cross-sectional area of mixing tube 868 (generally indicated at reference point 913) in order to accelerate the fuel/air mixture and thereby increase the mixture velocity delivered into combustion chamber 852 relative to the velocity in the mixing tube 868. The significance of this feature can be appreciated from understanding that flames from chamber 852 could otherwise ignite fuel within mixing tube 868 when the flow of fuel/air mixture is at a low speed relative to the flame speed in combustion zone 854. By utilizing ports 907, sized to increase the velocity of the flow of fuel/air mixture, the likelihood that flame from combustion chamber 852 will "flash back" into the mixing tube is reduced. Further, by increasing the velocity of the flow, it is believed that the boundary layer along channels 901 and at ports 907 is reduced, thereby eliminating low velocity regions where the flame from combustion chamber 852 can creep along the surfaces of nozzle assembly 872 and flash back into mixing tube 868. It is also believed that the aforementioned geometry is particularly useful when compressed air variations occur in mixing tube 868, which otherwise could cause variable flame fronts or pulsations within combustion chamber 852. The increased pressure at ports 907 also can dampen the minor variation in compressed air velocity in the premixer and reduce such pulsations. These advantages are useful in maintaining the structural integrity of the combustor system and its individual components, and thus provide a benefit to the integrity and performance of the overall gas turbine engine itself.

Figure 9A:
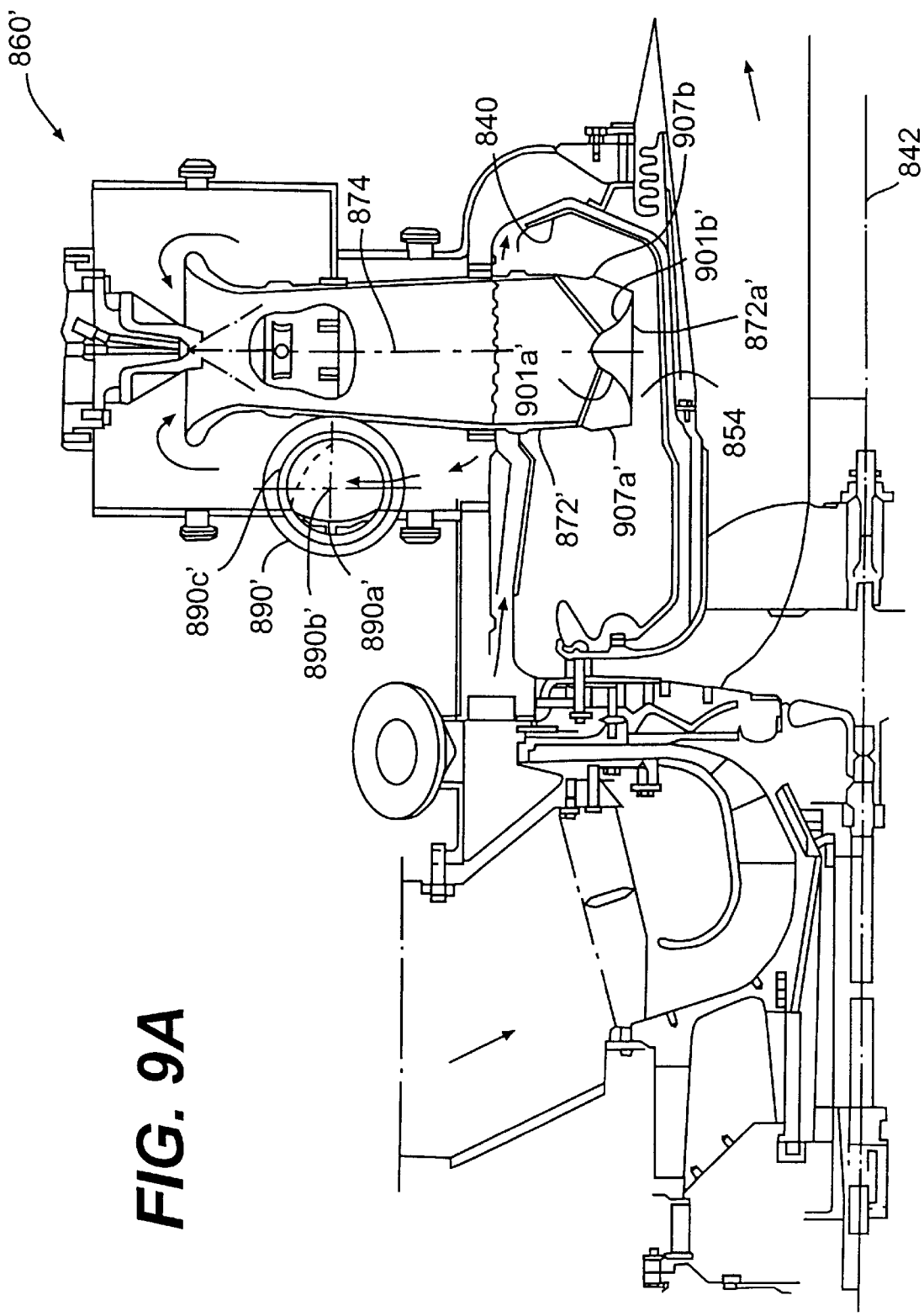
FIG. 9A is a schematic cross-section of a variation of the premixer assembly shown in FIG. 9 using a cylindrical air valve.

FIG. 9A depicts a variation of the construction shown in FIGS. 8 and 9 with the principal differences being that the premixer 860' includes a cylindrical-type air valve 890' in place of the butterfly-type air valve 890 and an asymmetric nozzle assembly 872' arrangement. Air valve 890' has a rotatable inner cylinder section 890a', which progressively increases or diminishes the amount that valve outlet opening 890c' is occluded to permit more or less air flow through valve 890' upon rotation of the cylinder/sleeve 890a' about axis 890b'. One skilled in the art would understand that other cylindrical valve constructions could be used.

FIG. 9A also depicts a nozzle assembly 872' having asymmetric nozzle ports 907a' and 907b' configured to minimize the amount of fuel/air mixture impinging on the axially rear wall of liner 840. That is, the configuration of the flow directing surfaces 901a' and 901b' of nozzle end cap 872a' are configured to admit the fuel/air mixture into combustion zone 854 predominantly in the tangential direction with respect to axis 842 of the combustion chamber while still admitting some of the fuel/air mixture into other regions (i.e., to the right and left of the venturi axis 874 in FIG. 9A). This asymmetric nozzle port arrangement permits more effective utilization of the combustion volume while minimizing fuel/air mixture impingement on the liner wall, which can lead to carbon build up, uneven heat transfer, and increased thermal stress-caused distortions.

Figure 9B:
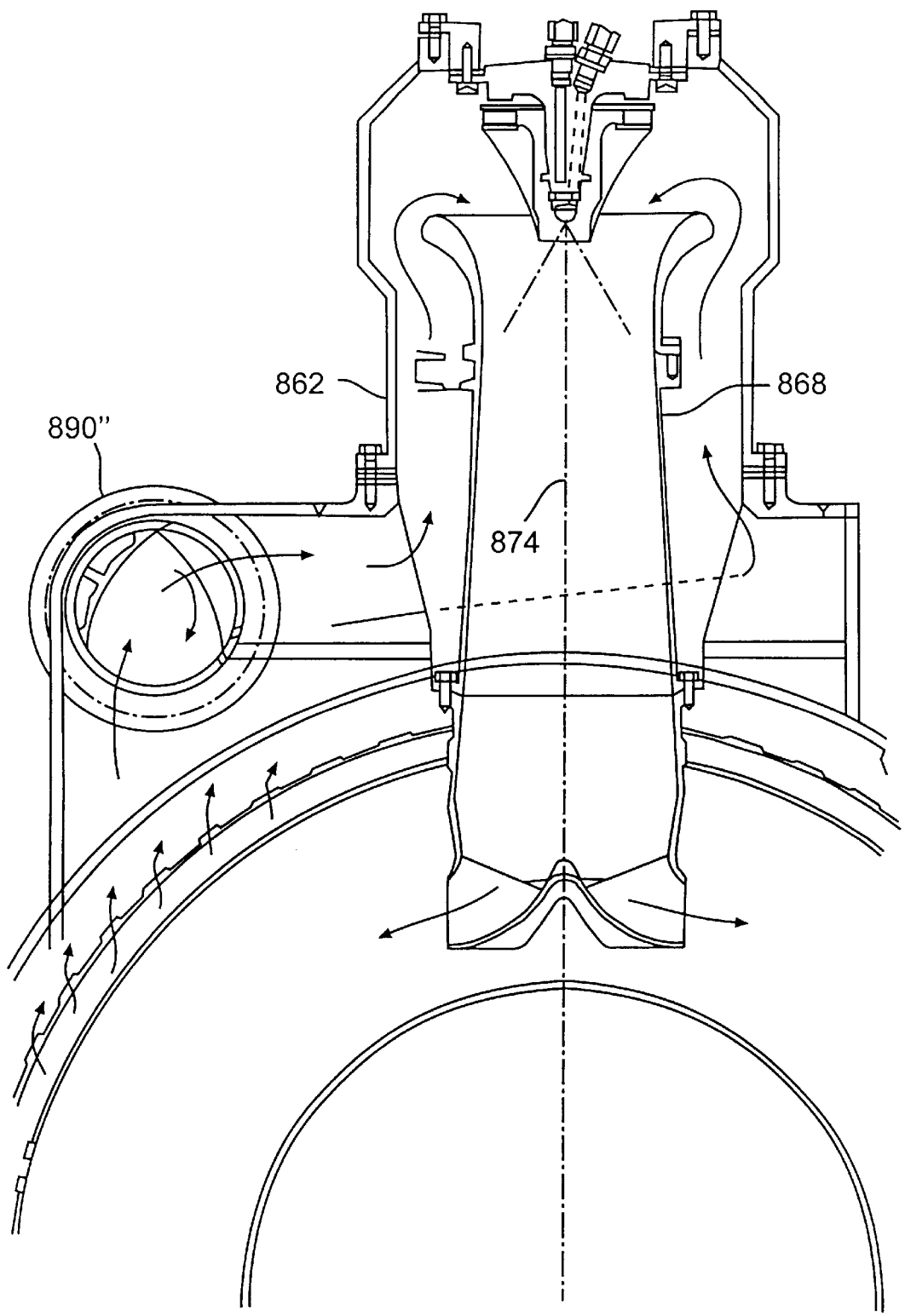
FIG. 9B is a schematic cross-section of a further modification of the premixer assembly in FIG. 9A.

FIG. 9B is a modification of the construction shown in FIG. 9A with the cylindrical-type air valve 890" spaced a greater distance from the portion of premixer housing 862 supporting the venturi mixing tube 868. It is expected that spacing air valve 890" greater distance from the premixer housing will help reduce the unavoidable asymmetries in the compressed air flow field exiting air valve 890" and allow the compressed air flow to be distributed more evenly in the premixer housing leading to the inlet of venturi mixing tube 868. This will minimize the pressure drop along the air flow path from the air valve to the venturi inlet and allow a higher maximum power level for the engine while maintaining low emission levels.

It should be appreciated that an exit nozzle according to the present invention can be connected to a mixing tube by installation methods known to those skilled in the ;art. For example, as depicted in FIGS. 10 and 11, nozzle assembly 872 may have a flanged connection 915 and attachment locations 917 for connecting the nozzle assembly to a mixing tube having a mating flanged structure. Alternatively, a mixing tube can incorporate the nozzle assembly into its overall structure.

In further accordance with the present invention, the mixing tube is connected to the liner so the flow axis of the mixing tube is aligned to generally intersect the liner axis. However, at least some of the channels of the exit nozzle are formed to direct fuel/air mixture in the combustion zone in a substantially tangential direction with respect to the liner axis. This radial orientation of the mixing tubes can provide a more precise sliding fit between the mixing tube and the combustor liner because the combustor inlet opening is less elongated. This results in less leakage, and less lateral movement and thermal distortion during operation.

As embodied herein, and with reference to FIGS. 8 and 9, controlled swirling flow and combustion is provided in combustion zone 854 by orienting nozzle assembly 872 so the fuel/air mixture will flow in a direction generally between liner wall 840a and liner wall 840b. Mixing tube 868 is radially mounted to liner 840 so that mixing tube flow axis 874 generally intersects liner axis 842. It should be appreciated that alignment need not be precise, so long as divided flows of the fuel/air mixture can be directed by nozzle assembly 872 into the combustion chamber without appreciably impinging liner walls 840a and 840b. Although some impingement of liner wall can be expected, it is preferred to minimize the amount of fuel/air mixture impacted on a given surface in order to reduce the amount of carbon deposited on such a surface during the combustion process. Carbon deposits can eventually insulate areas of the liner, causing problems of thermal fatigue and localized overheating of the combustion chamber.

In operation, and with reference to FIGS. 8–11, compressed air from plenum 830 is channeled via passageway 882 over the outside surface of liner 840 for cooling liner 840, and particularly portions which surround combustion zone 854. A portion of the compressed air flowing in passageway 882 is admitted to plenum 884 through orifices 885 and then flows to fuel/air premixer assembly 860 via the interconnection between fuel/air premixer housing assembly 862 and plenum 884 as controlled by compressed air valve 890 via controller 894. This portion of the compressed air is essentially all the compressed air used for combustion (except for inadvertent leakage and compressed air that may be used to power an air-blast type fuel nozzle). In mixing tube 868, the compressed air portion is mixed with the fuel from fuel nozzle 864, again possibly with a small additional portion of compressed air if nozzle 864 is a "air-blast" type nozzle, and is directed along the mixing tube axis 874 to nozzle assembly 872, where the fuel/air mixture is divided into paths along channels 901 and accelerated out of ports 907 into combustion zone 854 of combustion chamber 852. By the orientation and sizes of the nozzle assembly ports 907, the designer can control the distribution and direction of the fuel/air mixture within the combustion volume.

After combustion of the fuel/air mixture in zone 854, the hot exhaust gases pass to dilution zone 856 where dilution air from dilution ports 858 reduces the average temperature of the exhaust before it is ducted via channel 850 past vanes 834 to turbine 820 for work-producing expansion.

The control of combustion afforded by combustion system 810 in accordance with the present invention through the complete mixing of the fuel and air outside the combustion chamber in the fuel/air premixer, including complete vaporization of the fuel if liquid fuel is used, together with the control of the fuel/air ratio of the mixture delivered to the combustion chamber allows for significant reductions in $NO_x$ levels and the levels of unburned fuel and fuel by-products emanating from engine module 812, as mentioned earlier. Furthermore, the efficient utilization of essentially the total amount of compressed air flow to either combust the fuel or to dilute the exhaust gases upstream of the turbine provides increased efficiency, considerable reduction of peak combustor temperatures resulting in longer life for combustor liners compared to conventional designs.

The system described is expected to provide low emissions at all power ratings for high inlet temperature gas turbine applications while keeping variable geometry flow apparatus away from and outside the hot combustor area.

Figure 12:
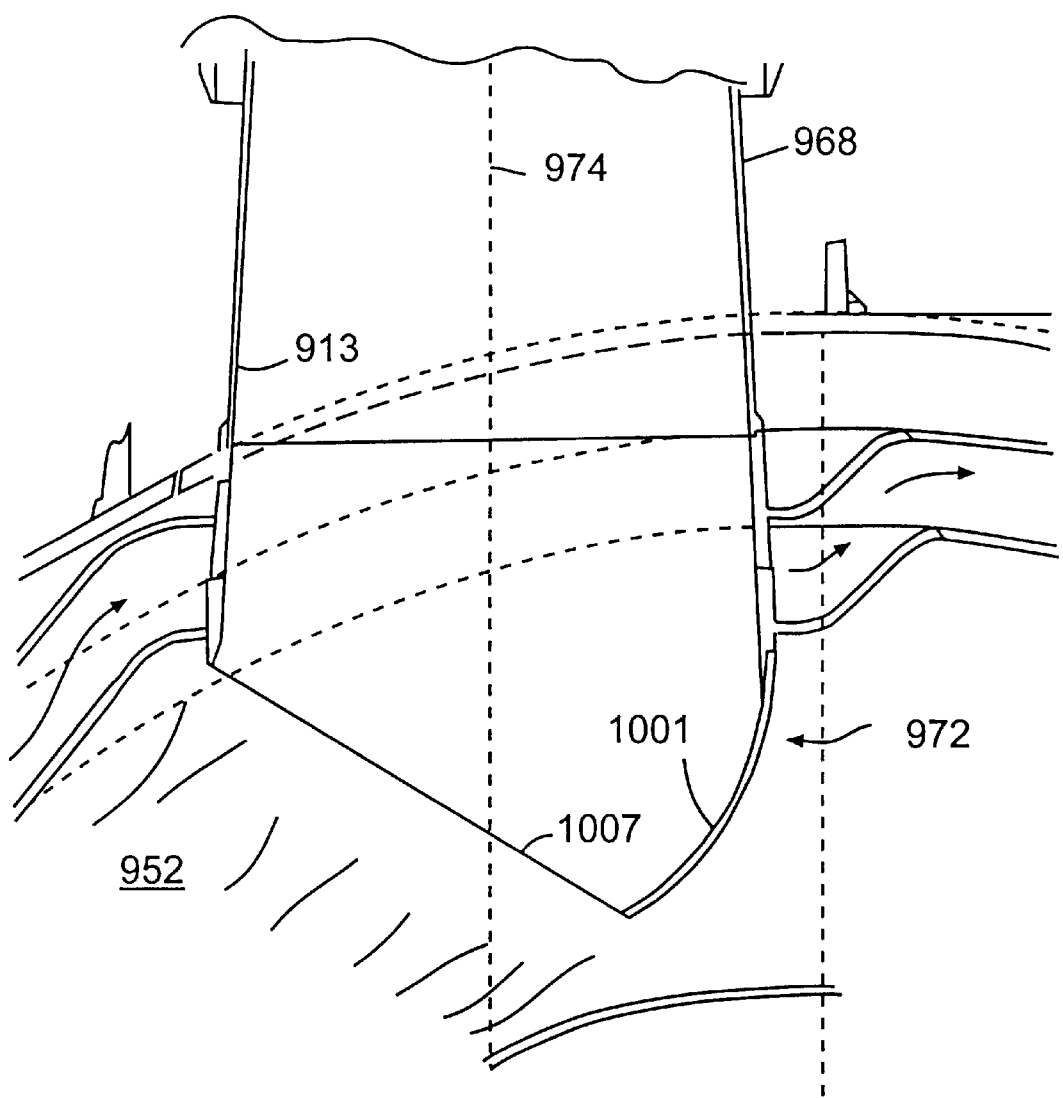
FIG. 12 is a schematic cross-section of another premixer assembly made in accordance with the present invention.

Alternatively, as seen in FIG. 12, another embodiment is illustrated in which a nozzle assembly 972 has a single channel 1001 for directing the flow of fuel/air mixture in a direction that is generally tangential to the combustion chamber axis due to the downwardly sloped surfaces of channel 1001. Nozzle assembly 972 further includes a single port 1007 in flow communication with channel 1001 for distributing fuel/air mixture within combustion chamber 952. Preferably, the total cross-sectional area of port 1007 is about 70–90% of the cross-sectional area of mixing tube 968 (generally indicated at reference point 913) in order to increase the acceleration of the fuel/air mixture delivered into combustion chamber 952.

Although the above descriptions relate to radially mounted mixing tubes which have a nozzle assembly that extends into the combustion chamber, the present invention and its advantages are applicable to other mixing tube positions and configurations. For example, it should be appreciated that a mixing tube may be connected to the liner so the flow axis of the mixing tube is slightly tangentially aligned to the liner axis. As such, the mixing tube's exit nozzle or other like structure can be oriented to direct the flow of the fuel/air mixture tangentially into the combustion zone and preferably minimize impingement of flow onto the liner while maintaining a simple geometric configuration at the liner inlet compared to constructions such as depicted, e.g., in FIG. 1B, where venturi axis 74, is substantially tangentially oriented with regard to liner axis 42.

Figure 13:
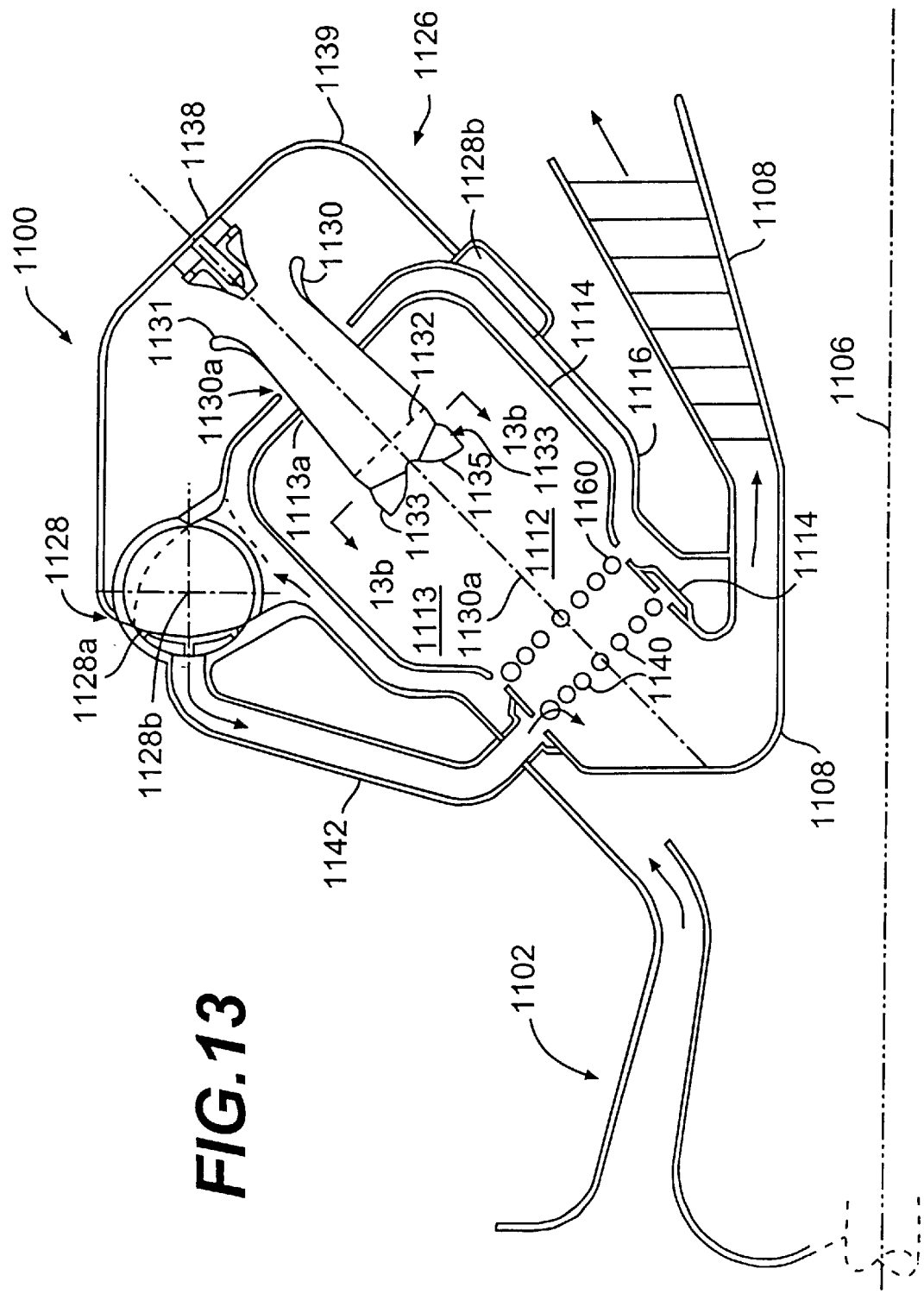
FIG. 13 is a schematic cross-section of another gas turbine engine module made in accordance with the present invention and having a can-type combustor.

In further accordance with the present invention, the described premixer assembly may be utilized by a can-type combustor system. As embodied herein, and with reference to FIG. 13, combustor system 1100 includes a combustion chamber 1112 including combustion zone 1113 defined by combustion chamber liner 1114. Around liner 1114 is disposed, in spaced relation, pressure vessel 1116, which partly functions as a cooling shroud. A premixer assembly 1126 includes an air valve 1128 and a venturi-type mixing tube 1130, a portion of which is disposed outside liner 1114, and a nozzle assembly portion 1132 disposed to deliver a fuel/air mixture within combustion zone 1113 of chamber 1112. Fuel nozzle assembly 1138 mounted in premixer housing 1139 delivers a spray of fuel into a mixing tube inlet region 1131, where it is mixed in mixing tube 1130 with compressed air in an amount partially controlled by valve 1128 that is fed by compressor 1102. As shown in FIG. 13, valve 1128 is a cylindrical-type three-way valve with rotatable sleeve 1128a (although other types of valves are possible) and can direct air to venturi mixing tube 1130 or to secondary dilution ports 1140 in liner 1114 via bypass conduit 1142 and manifold 1144 (as taught earlier in this specification).

Figure 13A:
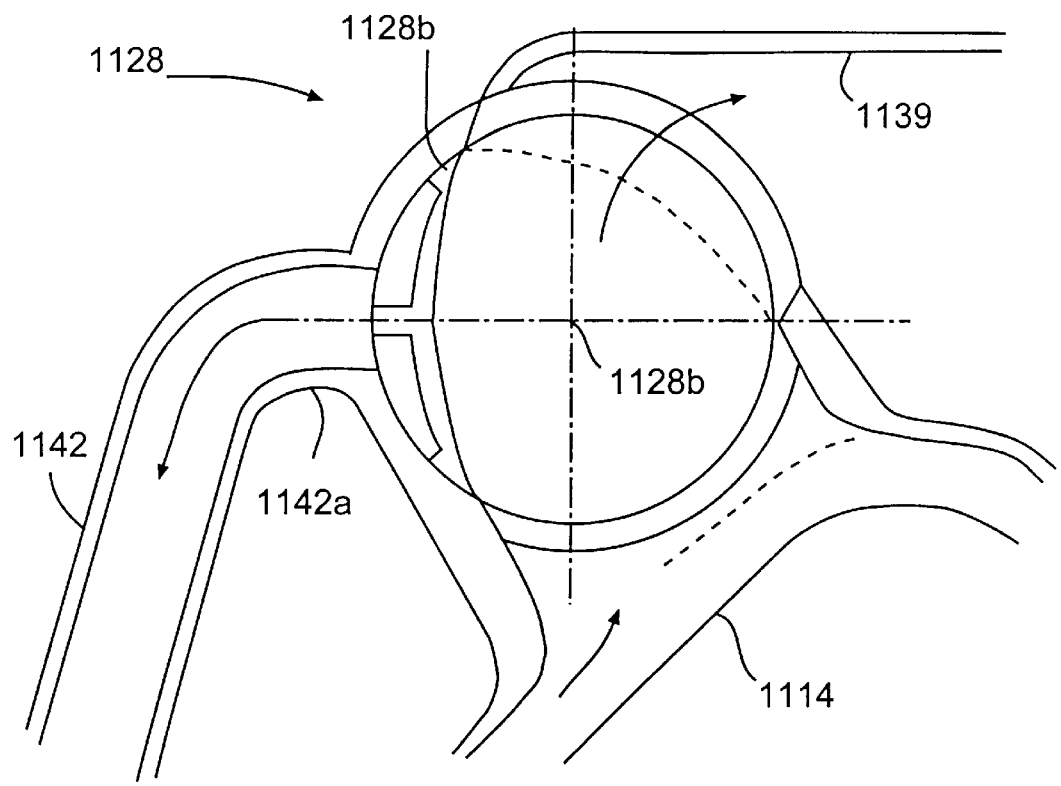
FIG. 13A is an enlargement of the air valve component depicted in FIG. 13.

FIG. 13A is an enlargement of the portion of FIG. 13 showing air valve 1128 including rotatable sleeve 1128a, which is a circular segment that can act as a seal against about ⅓ of the inner circumference of the valve. Sleeve 1128a can be rotated by an actuator (not shown) about axis from a position totally obscuring the entrance 1142a to bypass conduit 1142 (as shown in solid in FIG. 13A) to a position blocking air flow to venturi mixing tube 1130 via premixer housing 1139 (shown in dotted FIG. 13A), and allowing full bypass flow to secondary dilution ports (not shown).

For engine applications requiring multiple premixers, an air valve can be provided for each can combustor (as shown in FIG. 13A) or for each pair of combustors, such as depicted in the FIGS. 14A–14D embodiment (to be discussed infra), and then connected to a common actuator which would move all the valves simultaneously, in the same way as variable stator blades are moved on axial compressors. One skilled in the art thus would be able to easily adapt the present invention to such engine applications.

With continued reference to FIG. 13A, primary dilution ports 1160 receive a portion of the compressed air from compressor 1102 at a point upstream of manifold 1128b of valve 1128. The dilution portion is dependent upon the pressure drops through the respective flow paths as well as the number and sizing of dilution ports 1160, as one skilled in the art would readily understand. The portion of liner 1114 defining combustion zone 1113 is purposefully sealed off from receiving air except through mixing tube 1130 disposed in chamber inlet 1113a in order to maintain control of the fuel/air ratio and provide low emissions. A gap 1130a is provided between mixing tube 1130 and pressure vessel 1116 to pass combustion air sufficient for idle operation.

Figure 13B:
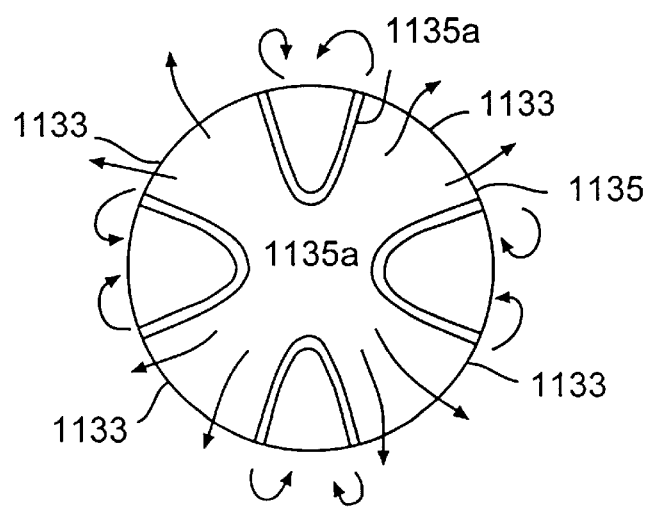
FIG. 13B is a schematic cross-section of the nozzle of FIG. 13 assembly taken along line 13B—13B.

Nozzle assembly 1132 is depicted as part of mixing tube 1130 and extending into the combustion chamber 1112 at the center of the can-type combustor liner 1114. As further shown in FIG. 13B, nozzle assembly 1132 has an end plate 1135 with surface convolutions 1135a forming four channels that direct the fuel/air mixture within chamber 1112 through ports 1133, thereby optimizing the available combustion volume. A total of four ports 1133 are depicted as symmetrically arranged about mixing tube axis 1130a but an asymmetric arrangement with fewer or more ports can be used. Preferably still, the collective area at ports 1133 for nozzle assembly 1132 should be between about 70 and 90% of the largest cross-sectional area of the mixing tube 1130 in order to increase the velocity of fuel/air mixture admitted into chamber 1112 through ports 1133. It is believed that the aforementioned configuration will likewise achieve the benefits described for nozzle assembly 872 of the FIG. 8 embodiment.

Although shown with a three-way valve 1128 that is highly useful in applications requiring high bypass air flow (i.e., past the cooling channels formed by liner 1114 and pressure vessel 1116) during low power applications, can-type combustor system 1100 can be used with a two-way air valve as described elsewhere in this specification. Also, combustor system 1100 is depicted in use with an axial-type engine having axial compressor section 1102 and axial turbine section 1104, the engine axis being shown schematically as 1106 in FIG. 13. Combustor system 1100 using a can-type combustion chamber can be used in engine configurations employing radial and mixed axial-radial type compressors and turbines, as well.

It is also understood that one or more of the combustor systems can be positioned circumferentially about axis 1106 with the hot gas output of each collected and distributed in turbine inlet plenum 1108 providing low emission operation for the engine.

Figure 14A:
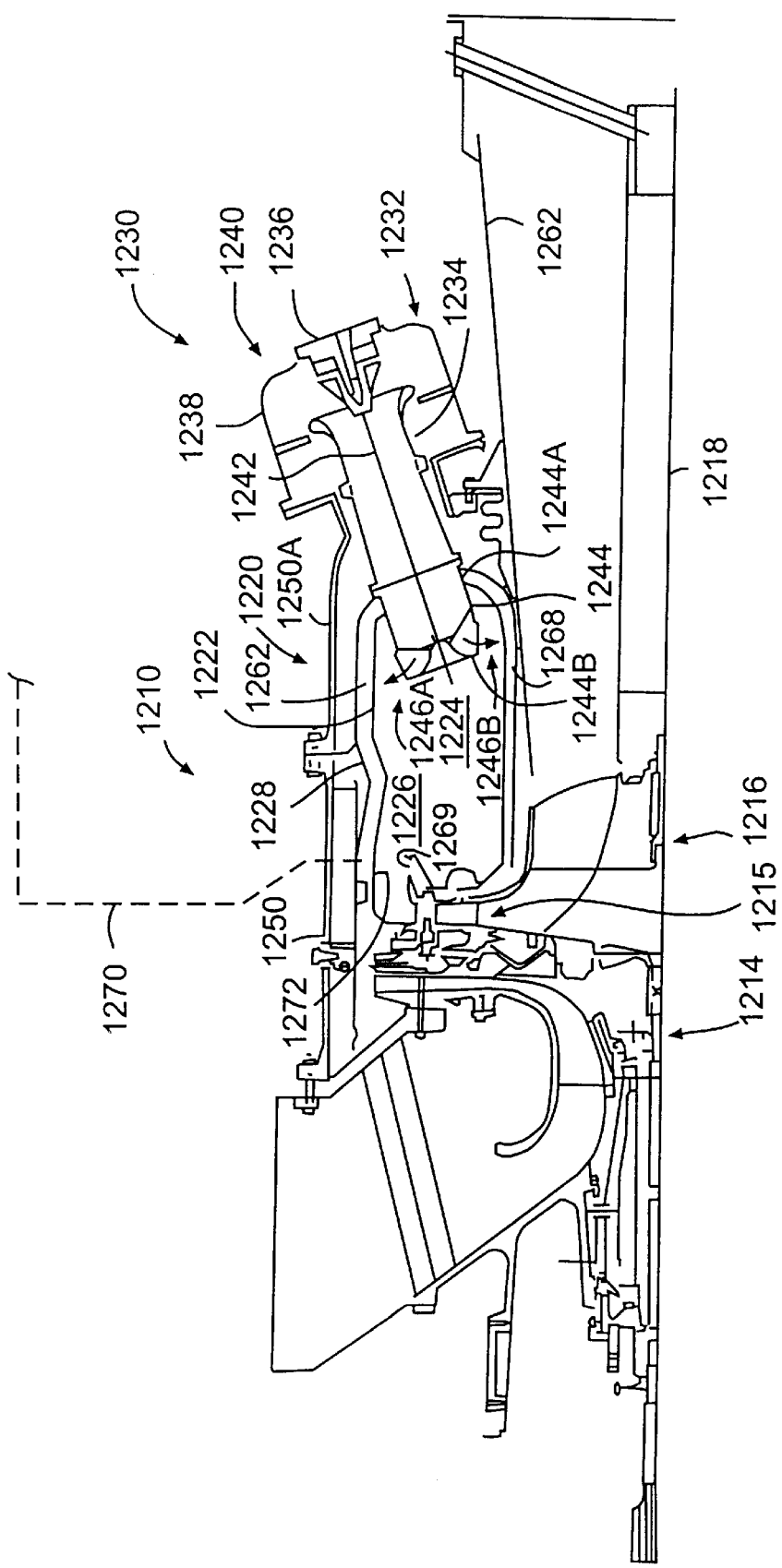
FIG. 14A is a schematic cross-section of another gas turbine engine module made in accordance with the present invention.

FIGS. 14A–14D show a particularly preferred configuration of a gas turbine engine having combustion apparatus made in accordance with the present invention. Specifically, FIG. 14A shows a sectional view through gas turbine engine 1210 having compressor section 1214 and turbine section 1216 operatively connected for rotation about engine axis 1218. Engine 1210 includes annular combustor chamber 1220, defined by liner 1222, with combustion zone 1224 and dilution zone 1226. Cooling shroud 1228 surrounds liner 1222 to provide flow passageways for convection cooling of liner 1222 particularly in the vicinity of combustion zone 1224. As with the other embodiments discussed previously, combustion zone 1224 is sealed off from the cooling air flowing through passageways 1262 and 1268 (see FIG. 14D) between shroud 1228 and liner 1220. Thus the combustion zone 1224 receives air for combustion only as part of the fuel/air mixture delivered to combustion zone 1224 through premixer assembly 1230 (to be discussed in more detail henceforth) and thus constitutes a "single stage" combustion zone.

With continued reference to FIG. 14A, premixer assembly 1230 includes a pair of premixers 1232 (only one being shown in FIG. 14A) each having a venturi-type mixing tube 1234 positioned to receive fuel from fuel nozzle 1236 and air from premixer housing 1238 through venturi inlet 1240. Each venturi mixing tube 1234 is configured to deliver fuel/air mixture along venturi axis 1242 and through nozzle assembly 1244 into combustion zone 1224. Nozzle assembly 1244 is constructed of extension member 1244a and end cap 1244b having its surface contoured to provide channels and ports 1246a, b for distributing the fuel/air mixture within combustion zone 1224, generally at an angle with respect to venturi axis 1242. See FIGS. 10 and 11 for examples. Although not seen in FIG. 14A, the ports 1246 also provide a flow direction for the fuel/air mixture that is in opposed directions with respect to axis 1242. Also as seen in FIG. 14A, premixer housing 1238, which surrounds venturi mixing tube 1234 and mounts fuel nozzle 1236, is itself mounted to separable end portion 1250a of engine pressure vessel 1250.

Figure 14B:
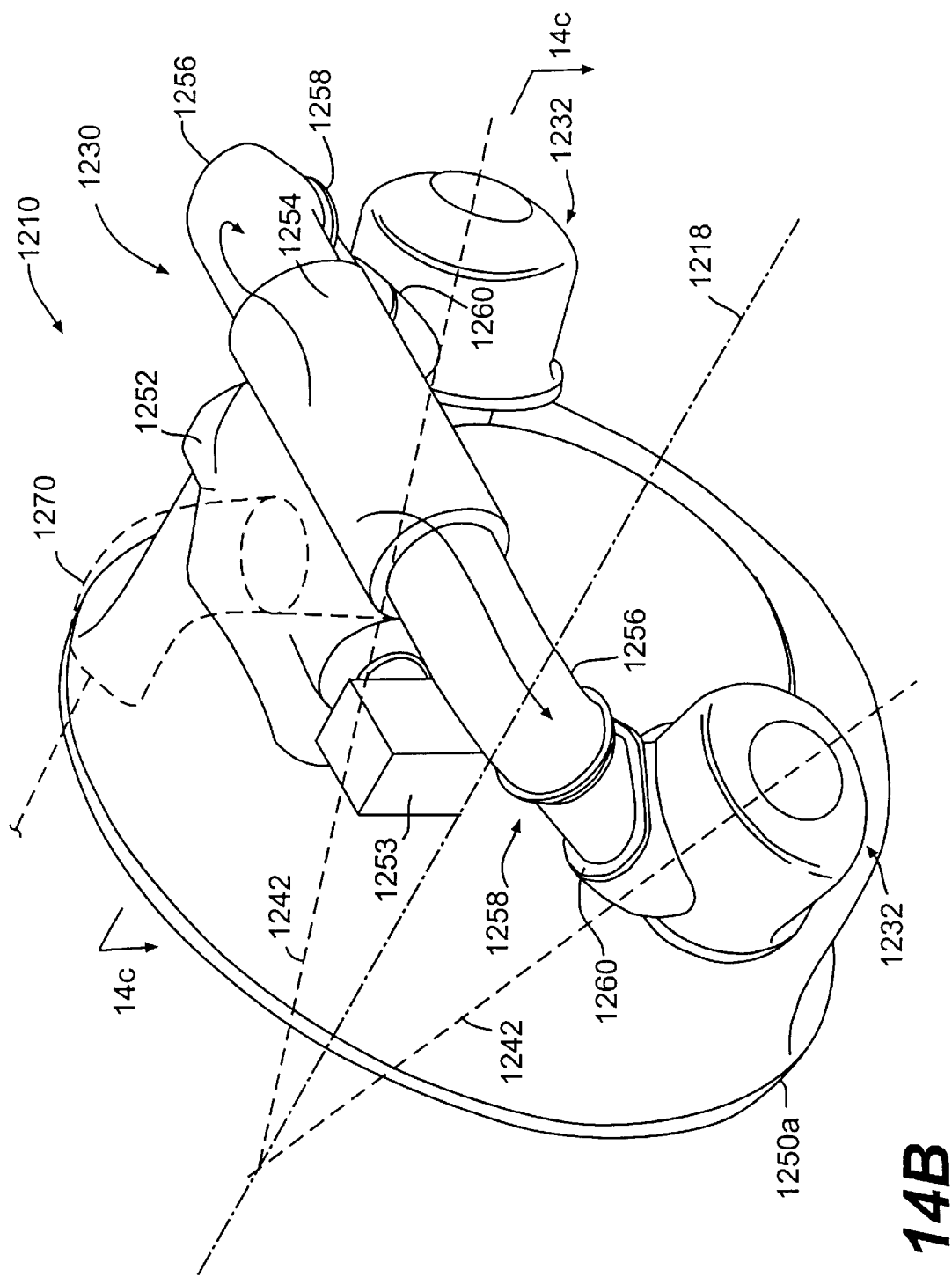
FIG. 14B is a schematic perspective end view of a part of the engine module of FIG. 14A.

FIG. 14B is a perspective schematic view of an end portion of engine 1210, which provides an understanding and appreciation for the highly advantageous configuration of engine 1210. As seen in FIG. 14B, the pair of premixers 1230 are mounted to the separable pressure vessel end portion 1250a at essentially diametrically opposed positions with respect to axis 1218. Premixer assembly 1230 also includes a single, cylindrical-type air valve 1252 also mounted on pressure vessel end portion 1250a. Air valve 1252 is activated by actuator 1253 to control the flow of compressed air for combustion to both premixers 1232 along air paths through manifold 1254 and a pair of distribution conduits 1256. Distribution conduits 1256 can be of a variety of shapes depending on the space limitations afforded by the balance of the components of the combustion apparatus and the engine. However, they should be configured to provide a minimum pressure drop and present essentially identical flow restriction characteristics. Distribution conduits 1256 are shown with bellows connectors 1258 leading to compressed air inlets 1260 in each of premixers 1232. Also, air valve 1252 is angularly disposed with respect to axis 1218 to be essentially equidistant from each of premixers 1232 to provide a compact arrangement For premixer assembly 1230 and to help ensure equal pressure drops between air valve 1252 and the individual premixers 1232. Although not shown in FIG. 14B, one or both of the distribution conduits 1256 can be purposefully made with a slightly higher or lower flow resistance than the other to allow flow balancing at the time of construction. Alternatively, preset flow restrictors could be used in distribution conduits 1256 to ensure proper flow balancing between the premixers, but such a construction would entail increases in the overall restriction in the compressed air flow path and thus is not presently preferred.

As a consequence of the configuration of premixer assembly 1230 including the mounting of not only premixers 1232 but also air valve 1252 on separable pressure vessel end portion 1250a, the entire premixer assembly 1230 is removable along with pressure vessel end portion 1250a. As best seen in FIG. 14A, upon removal of the turbine exhaust pipe 1262, premixer assembly 1230 can be removed along with pressure vessel end portion 1250a. This ease of assembly/disassembly is a significant advantage for the configuration of the combustion apparatus shown in FIGS. 14A–14D.

Importantly, the individual premixers 1232 are oriented and constructed such that the flow axes 1242 of venturi mixing tubes 1240 are both radially disposed and axially inclined with respect to axis 1218. That is, the extensions of venturi axes 1242 intersect or pass in close proximity to engine/combustion chamber axis 1218 while at the same time exhibit angles of significantly less than 90° with respect to axis 1218 as is depicted schematically in FIG. 14B. This orientation effectively utilizes the normally wasted annular space surrounding the turbine exhaust pipe and advantageously provides a smaller overall "envelope" diameter for engine 1210, of importance in applications requiring a minimized axial profile such as in certain aircraft applications. Moreover, the more effective utilization of the combustion space in combustion zone 1224 may allow the axial length of combustion chamber 1220 to be reduced, while maintaining sufficient residence time in the combustor to reduce CO and $NO_x$ levels to acceptable values. The axial shortening of combustion chamber 1220 has the advantage of reducing the total heat transfer area that must be cooled by passageways 1262 and 1268 (see FIG. 14D). The reduction in the required cooling air flow leads to a more effective use of the available supply of compressed air, particularly in recuperated engine applications when the recuperated return air would be hot.

With reference now to FIG. 14A and to FIG. 14C, which is a cross-section through the air valve 1252 and distribution manifold 1254, the principal combustion air flow path to the premixer assembly can be seen. In particular, air flows from the radial compressor unit 1214 first along the cooling passages 1262 formed between the combustion chamber liner 1222 and the cooling shroud 1228. In the vicinity of the end of the combustion chamber 1220 proximate the single stage combustion zone 1224, a portion of the compressed air flows outward through apertures 1264 in cooling shroud 1228 and is collected in plenum 1266 formed by cooling shroud 1228 and pressure vessel portion 1250a. Apertures 1264 may have any form and number as long as the remaining cooling air has guidance and maintains the correct velocity.

From plenum 1266, the compressed air flows past air valve 1252 and into distribution manifold 1254 where it splits with essentially half going to each of the respective premixers (not shown in FIG. 14C). The remainder portion of the compressed air, that is, the portion not flowing through the apertures 1264, flows to dilution ports 1269 (FIG. 14A) along passageway 1268 along the inner portion of the annular combustion chamber 1220. Because combustion is essentially completed in the vicinity of the dilution zone 1226 where the dilution air is added, the air traveling along passageway 1268 does not undergo combustion but only mixes with the hot combustion products prior to entering nozzle guide vanes 1215 and then turbine unit 1216.

As shown in FIG. 14C, air valve 1252 is a cylindrical-type valve having a rotatable inner cylinder section 1252a that can progressively close off or open flow paths through the air valve under the control of a fuel/air controller (now shown) via actuator 1253 as in previous embodiments. While other types of air valves can be used, such as butterfly valves, etc., cylindrical valves have been found to exhibit more predictable flow characteristics and be less subject to aerodynamic oscillations at a low flow rates and thus are presently preferred. While the cylindrical air valve 1252 shown in FIG. 14C is a "two-way air valve" the configuration could be modified to include a three-way valve used in conjunction with a second set of dilution ports. Such a construction is depicted in dotted lines in FIGS. 14A, 14B, and 14C which shows bypass conduit 1270 interconnected with secondary dilution ports 1272 (FIG. 14A) and is similar to the system shown in FIG. 13 at 1144. The benefits and advantages of such a bypass configuration are set forth in my copending application Ser. No. 08/892,397 filed Jul. 15, 1997 and my provisional application Ser. No. 60/038,943 filed Mar. 7, 1997, the contents of both of which are hereby incorporated by reference.

Figure 14D:
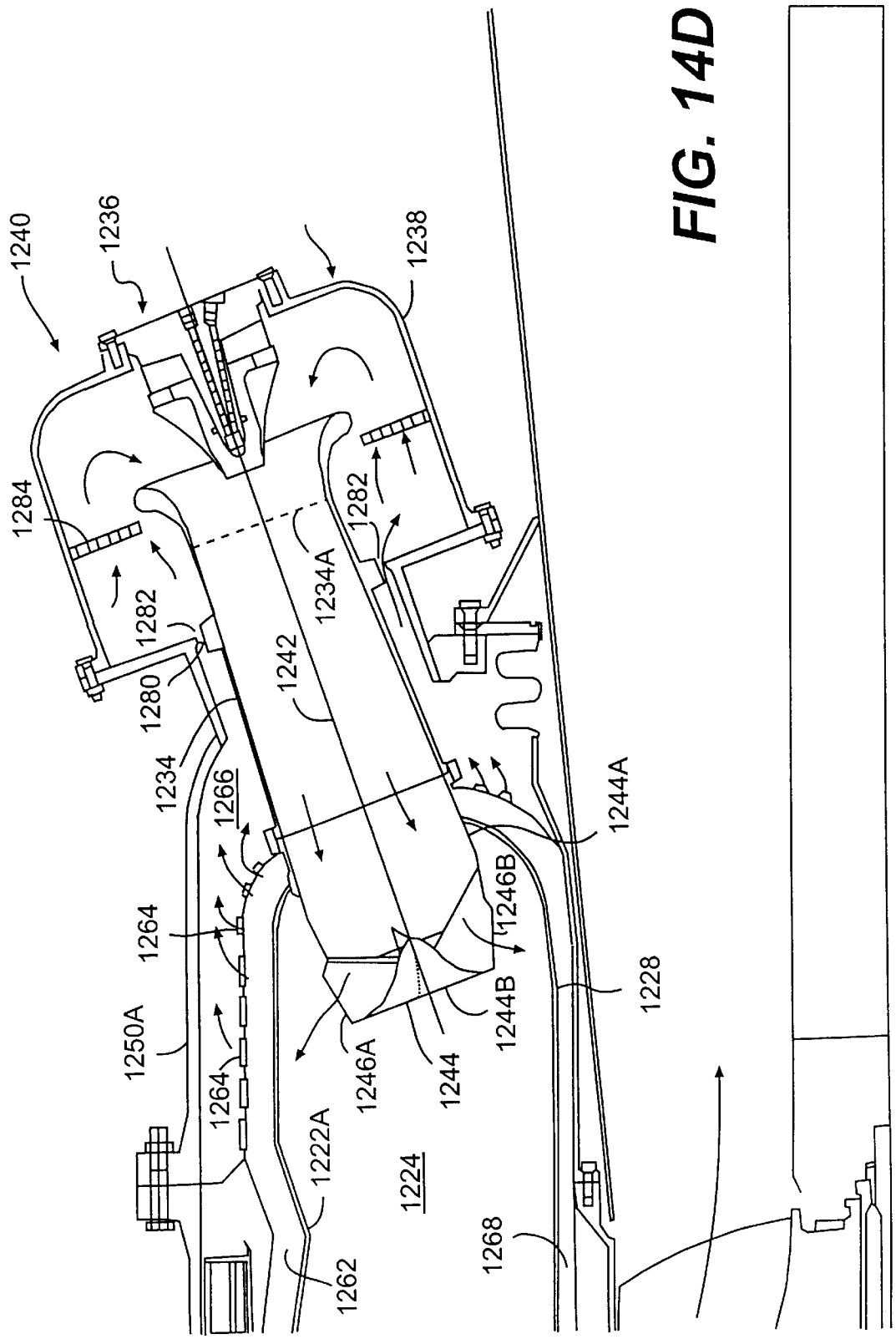
FIG. 14D is an enlargement of the portion of FIG. 14A showing the premixer assembly.

FIG. 14D is an enlargement of the premixer cross-section shown in FIG. 14A and shows in more detail certain additional features of the preferred design. Specifically, FIG. 14D shows venturi mixing tube 1234 having cylindrical flange 1280 which defines an annular opening with premixer housing 1238. This annular opening is configured and sized to pass an amount of compressed air sufficient for operation of engine 1210 at idle conditions. That is, the air flowing through opening 1282 is taken from the same plenum 1266 that supplies air to the premixers through air valve 1252 but bypasses air valve 1252 and thus is not directly controlled by it. This arrangement allows for simplification in the design of air valve 1252 inasmuch as it is not required to pass a minimum amount of air to sustain combustion at idle operation. Opening 1282 can be configured to have predictable and thus easily controlled air flow rates.

Also shown in FIG. 14D is a flow-evening grid 1284 mounted in premixer housing 1238 to surround venturi mixing tube 1234 in the vicinity of inlet 1240. The function of grid 1284 is to redistribute the flow entering premixer housing 1238 via inlet 1260 and to even out other flow asymmetries arising from the structural features of the premixer housing 1238 in order to obtain a more even circumferential inflow into venturi inlet 1240. Grid 1284 can have an array of evenly spaced and dimensioned orifices or the array can be asymmetric in either orifice positioning or orifice dimensions in order to achieve the desired redistribution of the flow about the venturi entrance 1240.

Also depicted in FIG. 14D is a circumferential indent 1222a in combustion liner 1222 which is intended both to retard the axial flow of combustion products in combustor 1220 to gain more residence time and thus lower CO levels, and to strengthen the structure against buckling. Nozzle assembly 1244 can clearly be seen to be asymmetric in terms of the outlet ports 1246a and 1246b formed by the cooperation of nozzle end cap 1244b and extension member 1244a. As discussed previously, the asymmetries in the nozzle exit ports are intended to allow better distribution of the fuel/air mixture within the volume of the combustion zone while precluding excessive direct impingement of the fuel/air mixture on proximate portions of the combustor liner. That is, exit ports 1246a and 1246b provide fuel/air mixture flows at different angles with respect to venturi axis 1242 and are related to the orientation of the nozzle in the combustion chamber. And, as in the embodiment disclosed in FIGS. 8, 9, 9A and 9B, the total exit area of the nozzle exit ports 1246a and 1246b is less than the maximum cross-sectional flow area in venturi-type mixing tube 1234 to provide acceleration through nozzle ports in order to reduce the possibility of "flashbacks" and burning within the venturi mixing tube itself. Generally, the area of the maximum flow area is at the end of the diverging portion of the venturi region.

While a single pair of premixers 1232 is shown in the FIGS. 14A–14D embodiment, two or more pairs could be used, each pair feeding an angular sector of the combustion chamber and having a single air valve and respective distribution manifold and distribution conduits located between the associated premixers. In general, particularly for larger engine sizes, it is highly useful to have multiple premixers to provide a substantially even gas velocity distribution in all portions of the combustion zone, to minimize variations in heat transfer to the liner. The shape, location and number of the nozzle ports, such as ports 1246*a, b* in the FIGS. 14A–14D embodiment, also can impact on the gas velocity distribution and should be taken into account.

Figure 15A:
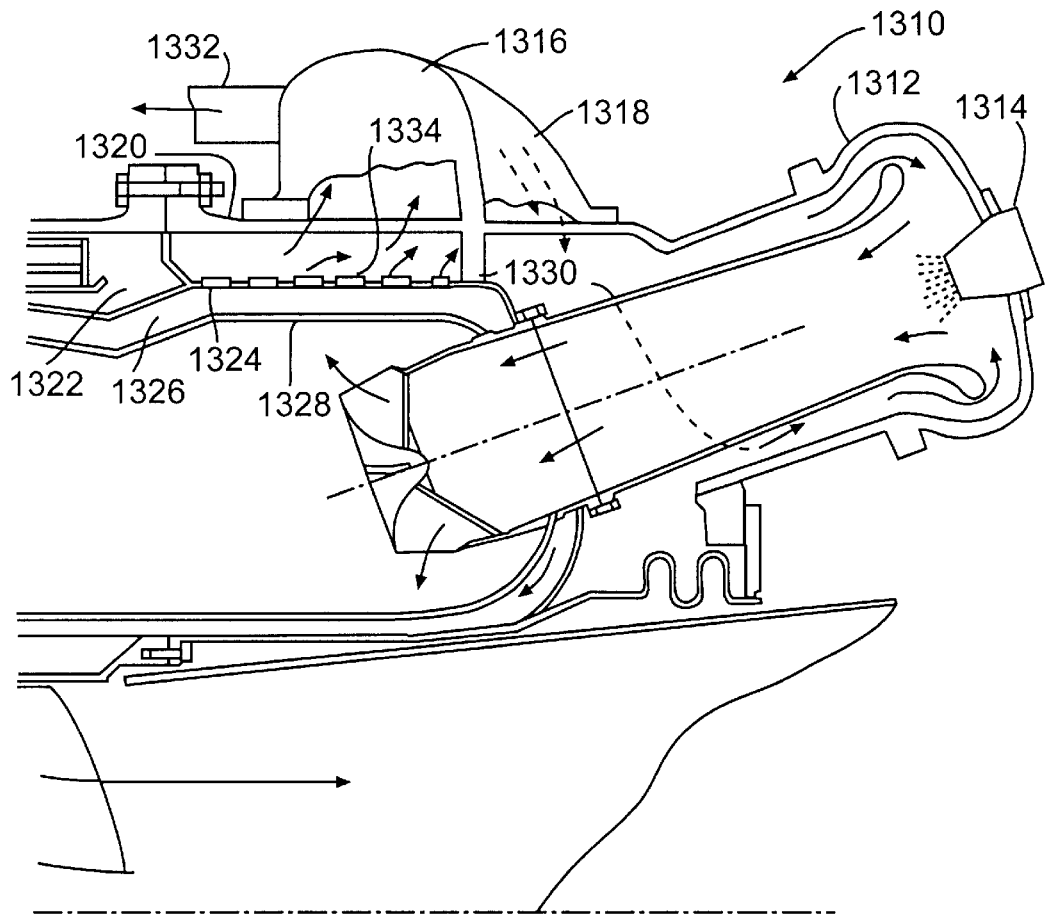
FIG. 15A is a longitudinal, schematic cross-section of yet another engine having combustor apparatus made in accordance with the present invention.
Figure 15B:
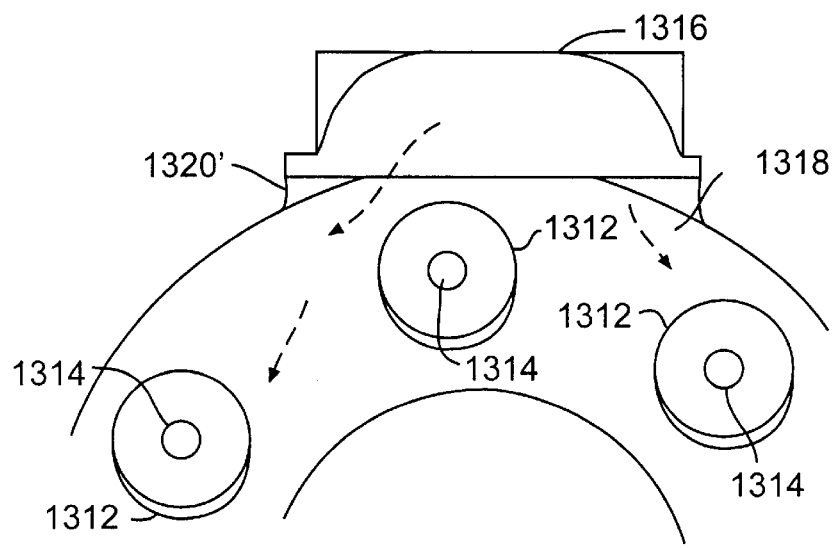
FIG. 15B is a partial end view of the embodiment in FIG. 15A.

Alternatively, multiple premixers can be used each with an associated air valve and actuator, but with the actuators interconnected, e.g., by a rotating ring to provide uniform control. A still further alternative uses a single air valve interconnected with multiple premixers via a doughnut-shaped plenum. Such a configuration is depicted schematically in FIGS. 15A and 15B which show a longitudinal cross-section and end view, respectively, of engine 1310 having multiple premixers 1312 each with a separate fuel nozzle 1314. A single air valve 1316 controls the flow of combustion air to distribution plenum 1318 which feeds each premixer 1312. The cross-sectional flow areas of plenum 1318 are made large enough so that the pressure drop along the flow paths from valve 1316 to the individual premixers is substantially the same, to ensure balanced flow. Air valve 1316 can be mounted anywhere convenient on the circumference of pressure vessel 1320 and preferably is of the "cylindrical" type discussed in previous embodiments. As seen in FIG. 15A, compressed air flow enters air valve 1316 directly from the compressor (not shown) through passage 1322 between pressure vessel 1320 and cooling shroud 1324 and also from cooling passage 1326 between shroud 1324 and liner 1328 through aperture 1334. Circumferential seal 1330 blocks compressed air flow from passages 1322 and 1326 directly into plenum 1318. Air valve 1316 is a "three-way valve" shunting excess compressed air directly to secondary dilution ports (not shown) via conduit 1332.

EXAMPLE

In order to assess the performance of the annular combustor system of the present invention, an annular combustor having the fuel/air premixer as shown in FIGS. 3A–3C was atmospherically tested using an external source of air and a gaseous fuel (natural gas). Table 1 presents values of the important dimensions of the apparatus used in the test.

TABLE 1

| | |
|---|---|
| Volume of combustion chamber | (12.3 × 10) |
| Outer diameter of combustion zone | (0.346 m) |
| Inner diameter of combustion zone | (0.200 m) |
| Radial distance from the housing axis to the venturi axis | (0.124 m) |
| Diameter of the venturi | |
| Throat | (45 mm) |
| Exit | (75 mm) |
| Perforated element hole diameter and pitch | (ø3.75 × 5 mm) |

Tests were done at flow conditions corresponding to idle and full load. Flow rates to achieve a preselected fuel/air ratio were set by manually setting compressed air valve 290 and the fuel valve (not shown) rather than by a controller element although a controller element could have been used. Table 2 presents the fuel and compressed air flow rates and other important parameters as well as the measured $NO_x$ levels and approximate CO emission levels for the tests.

TABLE 2

| | IDLE | FULL LOAD |
|---|---|---|
| BTU rating of natural gas (MJ/kg) | 38.02 | 38.02 |
| Fuel flow rate (g/s) | 2.45 | 3.12 |
| Total air flow rate: (g/s) | 183 | 160 |
| Fuel/Air Ratio | 0.033 | 0.033 |
| Compressed air inlet temperature (° C.) | 376 | 430 |
| Total pressure loss (percent): | 5 | 3 |
| Total air factor: | 2.3 | 2.3 |
| Pattern factor (percent): | 11 | 8 |
| $NO_x$ (ppm) at 15% 02: | 5 | 3 |

The above indicates remarkably low $NO_x$ emission levels which, even if scaled for high pressure operation, still would be well below the values considered representative of state of the art gas turbine engine module combustor systems using premixers. See G. Leonard et al., "Development of Aero Derivative Gas Turbine DLE Combustion System", Diesel and Gas Turbine Worldwide, May 1993, pp. 22 and 24.

With the above detailed description of the combustor system and fuel/air premixer apparatus and method of operating same of the present invention, those skilled in the art would appreciate that modifications may be made to the invention without departing from its spirit. Therefore, it is not intended that the scope of the invention be limited to the specific embodiments illustrated and described above. Rather, it is intended that the scope of this invention be determined by the appended claims and their equivalents.

What is claimed:

1. A combustor system for operation with a source of compressed air and a source of fuel, the combustor system comprising:

a cylindrical liner defining a single stage combustion chamber, the liner having an axis and having one or more inlets adjacent one axial chamber end, the portion of the chamber adjacent the one axial chamber end comprising a single stage combustion zone; and one or more fuel/air premixers each having an inlet for receiving compressed air, an inlet for receiving fuel, and a mixing tube for mixing the received compressed air and fuel and for delivering a fuel/air mixture to the combustion zone through a respective liner inlet, wherein essentially all air for combustion is delivered to the combustion zone solely through said one or more fuel/air premixers, wherein the mixing tube has a flow axis, an inlet adjacent one mixing tube axial end, and a nozzle at an opposite mixing tube axial end, the mixing tube inlet being flow connected to the compressed air inlet and the fuel inlet, and the nozzle extending into the combustion chamber and having one or more ports for distributing the fuel/air mixture within the combustion zone at an angle relative to the mixing tube axis.

2. The combustor system as in claim 1, wherein the mixing tube has a maximum cross-sectional area at a location upstream of the nozzle, and wherein a total cross-section area of the one or more nozzle ports is reduced relative to the mixing tube maximum area to provide acceleration of the fuel/air mixture through the one or more ports.

3. The combustor system as in claim 1, wherein the combustion chamber is an annular combustor, wherein the mixing tube flow axis is substantially radial to the liner axis, and wherein at least one of the one or more nozzle ports is configured for directing the fuel/air mixture tangentially with respect to the liner axis.

4. The combustor system as in claim 1, wherein the combustor chamber is a can combustor, wherein the mixing tube axis is substantially parallel to the liner axis, and wherein at least one of the one or more nozzle ports is configured for directing the fuel/air mixture radially with respect to the liner axis.

5. The combustor system as in claim 1, wherein the nozzle has a plurality of nozzle ports, and wherein at least one of the plurality of nozzle ports is configured for directing the fuel/air mixture at a different angle with respect to the mixing tube axis than another of the plurality of nozzle ports.

6. The combustor system of claim 1, wherein the nozzle has a plurality of nozzle ports, and wherein at least two of the plurality of nozzle ports are configured for delivering the fuel/air mixture in substantially opposed angular directions with respect to the liner axis.

7. The combustion apparatus as in claim 1, wherein the nozzle comprises an extension member connected to the mixing tube at the opposite mixing tube axial end and an end cap connected to the extension member and having circumferential portions spaced from the extension member to form the one or more ports; and wherein the end cap is configured to form conduits for directing the fuel/air mixture through the one or more ports.

8. The combustor system of claim 1, wherein the mixing tube is a venturi.

9. A gas turbine engine having the combustor system of claim 1.

10. Combustion apparatus for gas turbine having a source of fuel and a source of compressed air for combustion, the apparatus comprising:
  an annular combustion chamber including a portion defining a single stage combustion zone, the combustion chamber having an axis;
  a premixer assembly interconnected to the fuel source and the compressed air source and having two premixers angularly spaced with respect to the combustion chamber axis for mixing fuel with combustion air and for delivering a fuel/air mixture to said combustion zone, the combustion chamber portion being otherwise sealed off from the compressed air source;
  wherein each premixer includes a mixing tube oriented such that its axis is substantially both radially disposed and axially inclined with respect to the combustion chamber axis, each mixing tube having an inlet and an exit, each premixer also having a housing surrounding the mixing tube inlet, the premixer housing having an air inlet, and a fuel inlet connected to the fuel source;
  the premixer assembly further including an air distribution manifold and a pair of distribution conduits each interconnecting the manifold to a respective premixer housing air inlet, and a single air valve in a flow path between the compressed air source and the manifold for controlling the flow of combustion air to both of the two premixers through the manifold and the distribution conduits; and
  a nozzle connected to each mixing tube and extending into the single stage combustion zone for distributing the fuel/air mixture within the single stage combustion zone, the nozzle terminating in two or more ports angled relative to the respective mixing tube axis, wherein the respective flow directions through the two or more ports are substantially angularly opposed to each other relative to the combustion chamber axis.

11. The combustion apparatus of claim 10, wherein the two premixers are substantially diametrically opposed relative to the combustion chamber axis, and wherein the air valve and the manifold are angularly positioned substantially equidistant from the two premixers relative to the combustion chamber axis.

12. The combustion apparatus as in claim 10, wherein the air valve includes a rotatable cylindrical section.

13. The combustor system as in claim 10, wherein each mixing tube has a maximum cross-sectional area at a location upstream of the nozzle, and wherein a total cross-section area of the two or more ports is reduced relative to the mixing tube maximum area to provide acceleration of the fuel/air mixture through the two or more ports.

14. The combustion apparatus as in claim 10, wherein the combustion chamber includes a set of secondary dilution ports positioned downstream of the single stage combustion zone, the apparatus further including a conduit assembly operatively interconnecting the set of secondary dilution ports and the air valve, wherein the air valve also controls a bypass air flow from the compressed air source to the set of secondary dilution ports.

15. The combustion apparatus as in claim 14, wherein the air valve is interconnected to the compressed air source at a collection location through one or more first cooling passages surrounding the combustion chamber, wherein the combustion chamber has a set of primary dilution ports positioned downstream of the single stage combustion zone and flow connected to the first cooling passages at the collection location by second cooling passages, the bypass air flow through the conduit assembly bypassing the second cooling passages.

16. The combustion apparatus as in claim 10, wherein each of the mixing tubes is a venturi having an inlet, the apparatus further including a flow smoothing member positioned in each premixer housing in an air flow path between the premixer housing air inlet and the venturi inlet.

17. The combustion apparatus as in claim 10 further including a pressure vessel that surrounds the combustion chamber and includes a separable end portion, wherein the premixer assembly is mounted on the end portion to be separable therewith.

18. The combustion apparatus as in claim 17 wherein the pressure vessel end portion comprises part of a plenum, the plenum being flow connected to the premixers through the air valve along main combustion air flow paths; and wherein each of the premixer housings is configured to pass an idle portion of combustion air from the plenum to the respective mixing tube bypassing the main combustion air flow paths between the plenum and the premixers.

19. A gas turbine engine having the combustion apparatus of claim 10.

20. Combustion apparatus for a gas turbine having a source of fuel and a source of compressed air for combustion, the apparatus comprising:
  a combustion chamber liner portion defining a single stage combustion zone, for combusting fuel with combustion air, the single stage combustion zone having an axis;
  at least one premixer interconnected to the fuel source and the compressed air source and having a mixing tube for mixing fuel with essentially all the combustion air, and for delivering a fuel/air mixture into the single stage combustion zone, the mixing tube having a mixing tube axis, the single stage combustion zone being otherwise sealed off from the compressed air source; and
  a flame holder associated with the mixing tube and positioned within the single stage combustion zone along the mixing tube axis, the flame holder including an element for directing the fuel/air mixture along at least one path which is at an angle to the mixing tube axis.

21. The combustion apparatus as in claim 20, wherein the flame holder is attached to the mixing tube and is configured as a nozzle extending into the single stage combustion zone and having one or more ports for distributing the fuel/air mixture within the single stage combustion zone, the nozzle being internally cooled by the fuel/air mixture, and wherein a total exit flow area of the nozzle ports is less than a maximum cross-sectional flow area of the mixing tube.

22. A gas turbine engine having the combustor apparatus of claim 20.

23. The combustion apparatus as in claim 20 wherein said liner portion defines an annular combustion zone, and wherein a pair of said premixers are provided diametrically opposed relative to the combustion zone axis.

24. The combustion apparatus as in claim 23 wherein each one of the pair of premixers is radially disposed and inclined relative to the combustion zone axis.

25. The combustion apparatus as in claim 21 wherein said nozzle element defines at least two ports angularly opposed with respect to the mixing tube axis.

26. The combustion apparatus as in claim 25 wherein said two nozzle ports are asymmetric with respect to the mixing tube axis.

27. A combustor system for operation with a source of compressed air and a source of fuel, the combustor system comprising:

a cylindrical combustion liner defining a single stage combustion chamber, said having an axis and having at least one inlet port adjacent one axial chamber end, the portion of said chamber adjacent said one axial chamber end comprising a single stage combustion zone, and an exhaust port at the opposite axial chamber end; and at least one fuel/air premixer assembly having an inlet for receiving compressed air, an inlet for receiving fuel, and a premixer chamber for mixing the received compressed air and fuel and delivering the mixture to the combustion zone through the liner housing inlet, wherein the compressed air is delivered to the combustion zone solely through the premixer assembly;

wherein the premixer chamber includes a mixing tube having a flow axis, an inlet adjacent one axial mixing tube end, and a nozzle assembly at the opposite axial mixing tube end, the mixing tube inlet being flow connected to the compressed air inlet and the fuel inlet, the mixing tube being connected to the liner housing at the housing inlet, and the nozzle assembly extending along the mixing tube flow axis into the combustion chamber and having at least one port for distributing the fuel/air mixture within the combustion zone, said at least one port being angled relative to the mixing tube axis for directing the fuel/air mixture away from the mixing tube flow axis.

28. The combustor system of claim 27, wherein the collective cross-section area of said at least one nozzle assembly port is about 50–90% of a cross-section area of the mixing tube at a location where the mixing tube connects to the liner housing at the liner housing inlet port.

29. The combustor system of claim 27, wherein the combustion chamber is an annular combustor, and wherein the mixing tube flow axis is substantially radial to the combustion liner housing axis.

30. The combustor system of claim 27, wherein the combustor chamber is a can combustor, and wherein the mixing tube axis is substantially co-axial to the combustion liner housing axis.

31. The combustor system of claim 27, wherein the nozzle assembly includes a channel in flow communication with the nozzle assembly port for diverting the flow of fuel/air mixture in a direction away from the mixing tube flow axis.

32. The combustor system of claim 31, wherein the channel is formed to direct fuel/air mixture into the combustion zone in one or more directions with respect to the mixing tube flow axis selected from a group consisting of radial or mixed axial-radial directions.

33. The combustor system of claim 27, wherein the nozzle assembly has a plurality of channels, each angled away from the mixing tube flow axis and each terminating at one of a plurality of nozzle assembly ports for distributing the fuel/air mixture within the combustion zone.

34. The combustor system of claim 27, wherein at least two of said nozzle assembly ports are oriented to deliver the fuel/air mixture in substantially opposed angular directions with respect to the liner housing axis.

35. The combustor system of claim 27, wherein the mixing tube is a venturi.

36. A gas turbine engine having the combustor system of claim 27.

37. Combustion apparatus for gas turbine having a source of fuel and a source of compressed air for combustion, the apparatus comprising;

a combustion chamber liner portion defining a single stage combustion chamber having a combustion volume for combusting fuel with combustion air, the combustion chamber having an axis;

one or more premixers interconnected to the fuel source and the compressed air source, each of said premixers having a mixing tube, for mixing fuel with essentially all the combustion air, the mixing tube having an axis, the combustion chamber liner portion being otherwise sealed off from the compressed air source; and a nozzle assembly interconnected to the mixing tube and extending along the mixing tube axis and into the combustion chamber volume for distributing a fuel/air mixture within the combustion volume, the nozzle assembly terminating in at least two ports angled relative to the mixing tube axis, wherein the respective flow directions through the two ports are substantially opposed relative to the combustion chamber axis.

38. The combustion apparatus as in claim 37, wherein the liner defines an annular combustor.

39. The combustion apparatus as in claim 37, wherein the liner defines a can-type combustor.

40. A gas turbine engine having the combustor apparatus of claim 37.

41. Combustion apparatus for a gas turbine having a source of fuel and a source of compressed air for combustion, the apparatus comprising:

a combustion chamber having a liner portion defining a combustion volume for combusting fuel with combustion air, the combustion chamber having an axis;

a premixer assembly interconnected to the fuel source and the compressed air source and having one or more premixers each including a mixing tube with an axis, for mixing fuel with essentially all the combustion air, and for delivering a fuel/air mixture into the combustion chamber in a path along the mixing tube axis, the combustion chamber liner portion being otherwise substantially sealed off from the compressed air source; and a flame holder positioned within the combustion volume in the fuel/air mixture path, wherein the flame holder includes a nozzle assembly operatively connected to the mixing tube, the nozzle assembly including an end cap.

42. The combustion apparatus as in claim 41, wherein the nozzle assembly is configured for distributing the fuel/air mixture within the combustion volume.

43. The combustion apparatus as in claim 41, wherein the combustion chamber is annular and has an axis, wherein the nozzle assembly also includes an extension interconnecting the mixing tube and the end cap, the extension member and end cap extending into the combustion volume, and wherein the mixing tube axis is oriented substantially radial to the combustion chamber axis.

44. The combustion apparatus as in claim 43, wherein the nozzle assembly directs the fuel/air mixture within the combustion volume.

45. The combustion apparatus as in claim 44, wherein the nozzle assembly directs the fuel/air mixture along at least two opposed tangential directions relative to the combustion chamber liner axis.

46. A gas turbine engine having the combustor apparatus of claim 41.

47. The nozzle assembly as in claim 41 wherein said end cap is configured generally as an open-ended hollow cone having a vertex and oriented with the cone vertex directed toward the mixing tube, whereby recirculation of the fuel/air mixture in the hollow open end and flame holding can occur.

48. The nozzle assembly as in claim 43 wherein said end cap has a conical surface directed toward the mixing tube and is connected to said extension by a plurality of ribs, said ribs and said conical surface defining in part at least two channels for directing the fuel/air mixture away from the mixing tube axis and two exit ports for discharging the directed fuel/air mixture.

49. The nozzle assembly as in claim 48 wherein said ribs are open-ended hollow wedge-shaped members having rounded leading edges directed toward the mixing tube, whereby recirculation of the fuel/air mixture in the hollow open ends and flame holding can occur.

* * * * *

UNITED STATES PATENT AND TRADEMARK OFFICE
CERTIFICATE OF CORRECTION

PATENT NO. : 6,220,034 B1  
DATED : April 24, 2001  
INVENTOR(S) : R. Jan Mowill It is certified that error appears in the above-identified patent and that said Letters Patent is hereby corrected as shown below:

Column 33, claim 27,  
Lines 39 and 48, after "inlet", insert -- port --.

Column 36, claim 47,  
Line 5, after "vertex", insert -- and a conical surface --.

Signed and Sealed this

Fifth Day of March, 2002

Attest:

*Attesting Officer*

JAMES E. ROGAN  
*Director of the United States Patent and Trademark Office*